United States Patent [19]

Pietkiewicz et al.

[11] Patent Number: 5,539,630
[45] Date of Patent: Jul. 23, 1996

[54] SOFT-SWITCHING CONVERTER DC-TO-DC ISOLATED WITH VOLTAGE BIDIRECTIONAL SWITCHES ON THE SECONDARY SIDE OF AN ISOLATION TRANSFORMER

[75] Inventors: Andrzej Pietkiewicz, Burgdorf, Switzerland; Slobodan Cuk, Laguna Hills; Milivoje S. Brkovic, Pasadena, both of Calif.

[73] Assignee: California Institute of Technology

[21] Appl. No.: 154,461

[22] Filed: Nov. 15, 1993

[51] Int. Cl.[6] .......................... H02M 3/335; H02M 3/24; H02M 7/5387
[52] U.S. Cl. .................. 363/17; 363/98; 363/132
[58] Field of Search .................. 363/17, 18, 19, 363/20, 21, 78, 79, 98, 132, 134

[56] References Cited

U.S. PATENT DOCUMENTS

| | | | |
|---|---|---|---|
| 4,538,219 | 8/1985 | Morris et al. | 363/134 |
| 4,626,976 | 12/1986 | Abe et al. | 363/19 |
| 4,811,187 | 3/1989 | Nakajima et al. | 363/25 |
| 4,931,918 | 6/1990 | Inou et al. | 363/19 |
| 5,430,632 | 7/1995 | Meszlenyi | 363/17 |
| 5,438,497 | 8/1995 | Jain | 363/17 |

OTHER PUBLICATIONS

O. Arakawa et al., "Magnetic Snubber using Amorphous Saturable Reactor–Amorphous Beads," IEEE Applied Power Electronics Conference, (IEEE Publication 88CH2504-9) pp. 334–340,1988 Record.

C. P. Henze et al., "Zero–Voltage Switching in High–Frequency Power Converters Using Pulse–Width Modulation," IEEE Applied Power Electronics Conference, (IEEE Publication 88CH2504-9) pp. 33–40, 1988 Record.

R. A. Fisher et al., "A 500kHz, 250W DC–DC Converter with Multiple Outputs Controlled by Phase–Shifted PWM and Magnetic Amplifiers," High Frequency Power Conversion Conference, pp. 100–110, 1988 Record.

*Primary Examiner*—Matthew V. Nguyen
*Attorney, Agent, or Firm*—A. M. Fernandez

[57] ABSTRACT

A soft-switching dc-to-dc converter for providing regulated voltage to a load combines the functions of loss-less soft switching at zero voltage and at a constant switching frequency on the primary side and soft switching at zero current on the secondary side of an isolation transformer for all load currents from full load to no-load and PWM output voltage regulation on the secondary side. This is made possible by using voltage bidirectional switching element in series with a low-pass filter on the secondary side and current bidirectional switching element on the primary side driven at close to 50% duty ratio with adjustable dead time between switching. The adjustable dead-time is realized by sensing voltages across paired primary side current bidirectional switching element in order to enable alternate turn ON of said pair only at zero voltage, thereby eliminating or greatly reducing switching losses under all load current conditions. The output voltage is regulated by PWM control of the voltage bidirectional switching element comprising one of the following: a bipolar transistor, or a MOSFET in series with a diode, or preferably a saturable reactor in series with a diode to form a magnetic amplifier on the secondary side.

11 Claims, 19 Drawing Sheets

FIG. 4(a)
(PRIOR ART)
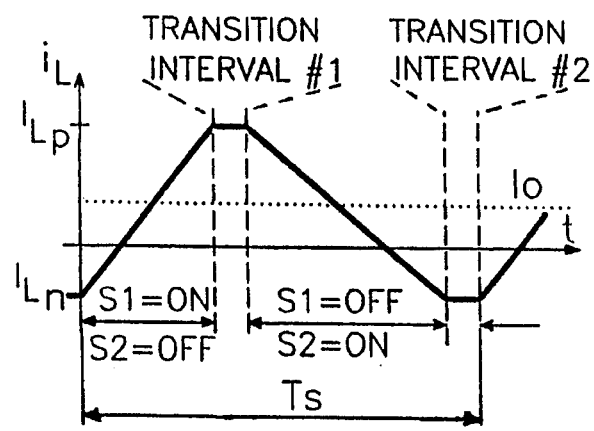
TRANSITION INTERVAL #1
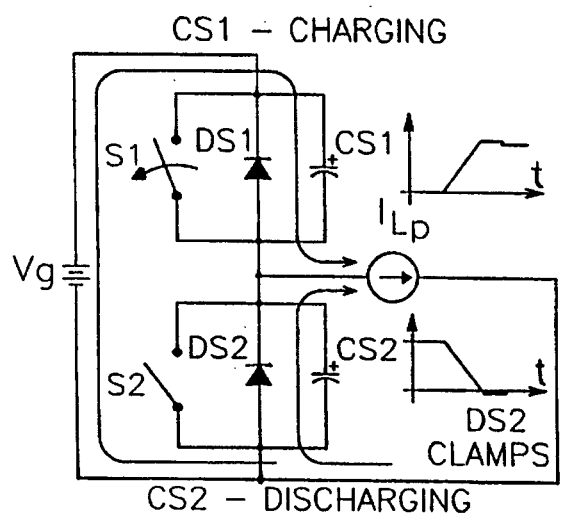
FIG. 4(b)
(PRIOR ART)
TRANSITION INTERVAL #2
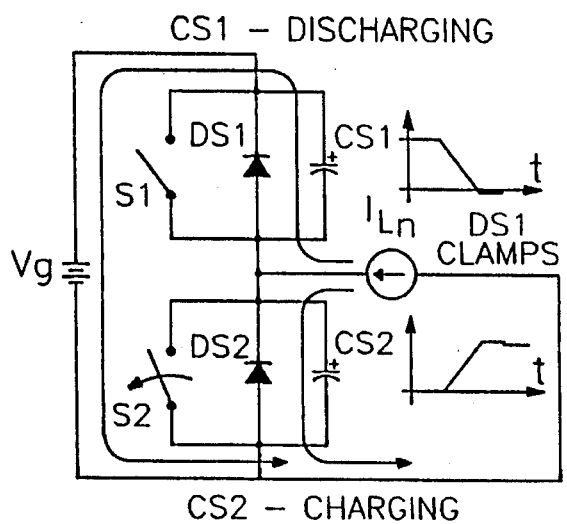
FIG. 4(c)
(PRIOR ART)

FIG. 12(a) ORIGINAL S1 DRIVE SIGNAL
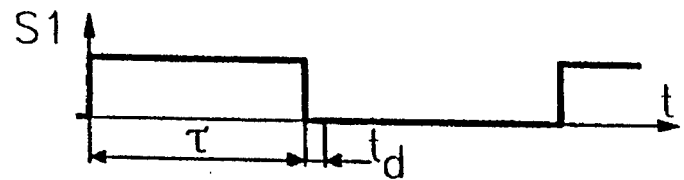
FIG. 12(b) ORIGINAL S3 AND S4 DRIVE SIGNALS
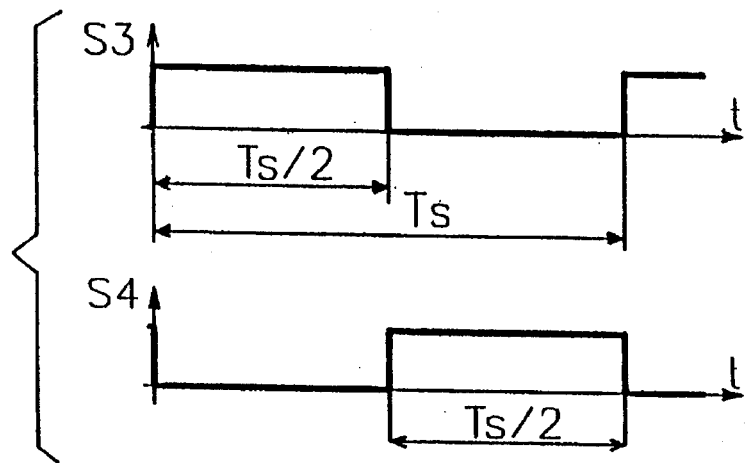
FIG. 12(c) DELAYED S3 AND S4 DRIVE SIGNALS
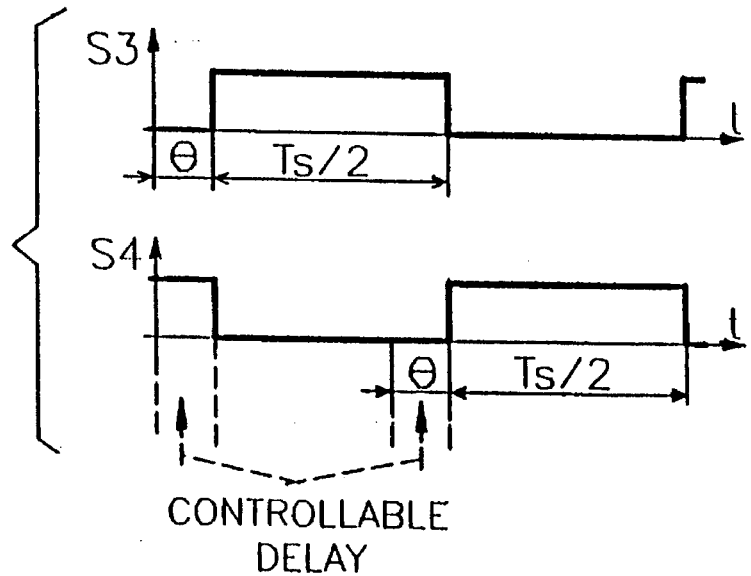

5,539,630

SOFT-SWITCHING CONVERTER DC-TO-DC ISOLATED WITH VOLTAGE BIDIRECTIONAL SWITCHES ON THE SECONDARY SIDE OF AN ISOLATION TRANSFORMER

FIELD OF THE INVENTION

The invention relates to dc-to-dc switching converters, and more particularly to switching techniques commonly referred to as soft switching in order to eliminate switching losses in the converter.

BACKGROUND OF THE INVENTION

With increased demand for faster response and reduced size and weight, switching frequency of dc-dc converters is increasing toward the megahertz range. The switching frequency of PWM converters was able to increase along with the speed of available switching semiconductor devices so long as the loss due to voltage/current overlap was the dominant limit on switching frequency. While faster power transistors have mitigated overlap loss, the reverse-recovery problem of power diodes as well as voltage spikes and discharging of the parasitic capacitances start to be limiting factors.

The buck converter shown in FIG. 1(a) is operated in a continuous conduction mode (CCM) and typical waveforms are shown as an example in FIG. 1(b). Like in any other PWM converter, semiconductor switching devices exhibit capacitive turn-on and inductive turn-off switching. Reverse-recovery current of the diode, discharging current of the parasitic capacitance across the transistor and energy stored in parasitic inductance do not contribute to power transfer but cause additional loss and produce voltage spikes and high-frequency parasitic oscillations as illustrated by waveforms in FIG. 2.

The problem of voltage spike and discharging parasitic capacitance are both consequences of the discontinuity of the waveforms of PWM converter as shown in FIGS. 1(b) and FIG. 2. As long as the converter has discontinuous waveforms, these two effects severely limit the performance at high switching frequencies. Only if the current and voltage are smooth and slowly varying the parasitic inductance and parasitic capacitance can be charged and discharged smoothly without losses.

One prior-art buck converter uses a noncontrollable saturable reactor in series with a rectifier diode as a magnetic snubber ("spike killer") to reduce reverse recovery current and its undesirable effects, O. Arakawa, T. Yamada and R. Hiramatsu, "Magnetic Snubber using Amorphous Saturable Reactor—Amorphous Beads," *IEEE Applied Power Electronics Conference*, (IEEE Publication 88CH2504-9), pp. 334–340, 1988 Record. Due to the nonlinear, square-loop characteristic of the magnetic core, a saturable reactor acts as a short circuit when saturated, thus not affecting power transfer. During the diode's turn-off, small negative diode current runs the saturable reactor out of saturation which represents large inductance and limits the slope of the reverse diode current di/dt, as well as its magnitude $I_{DRM}$. By this action, turn-off losses in the diode and consequently turn-on loss of the transistor due to the diode's reverse recovery current, as well as parasitic oscillations and voltage spike on the diode, are significantly reduced.

In order to solve problems associated with parasitic reactance, an objective of this invention is to prevent voltage and current waveforms from being discontinuous, i.e., to make the converter insensitive to these parasitic components, namely inductances and capacitances. Different converter topologies have been proposed as a solution to this problem in prior-art converters, such as resonant converter topologies and soft-switching converter topologies.

A resonant converter is a power converter in which one or more switching waveforms (either voltage or current) contain pieces of sinusoidal ringing waveforms. It means that a switching waveform is a continuous, large ripple voltage or current that starts from zero and returns to zero. Due to this, switching loss caused by the voltage/current overlap as well as due to parasitic reactances can be effectively eliminated so the switching frequency can be increased.

A large number of various resonant converter topologies and their derivatives, such as quasi-resonant and multiresonant converters, have been proposed in the prior art. Even though these topologies are superior in reducing switching losses, they all suffer from very serious drawbacks, such as: (a) large circulating reactive energy, (b) increased component stresses, (c) increased conduction loss, (d) restricted operating region, (e) difficult analysis, (f) variable switching frequency, and (g) complex control.

Considering the advantages and disadvantages for both PWM and resonant converter topologies, the "ideal" topology would combine the best features of both topologies. This includes low switching losses, constant frequency operation, low component stresses, reasonable rated reactive components, low level of generated EMI noise, and a wide control and load range. Several families of switching converters that combine PWM and resonant behavior are classified as soft-switching converters.

Resonant elements in soft-switching converters are not used for energy transfer, but rather for shaping the current or voltage during switching transitions in order to provide either zero-current or zero-voltage switching. During the rest of the switching period, the converter behaves like a PWM converter. The resonant frequency is well above the switching frequency, and the resonant voltage is "clamped" by a rectifier or second switch after a switching transition is completed. The waveforms between transitions look very much like those in PWM converters.

One of the prior-art methods which provides soft-switching in basic dc-to-dc converter topologies is explained in C. P. Henze, H. C. Martin and D. W. Parsley, "Zero-Voltage Switching in High-Frequency Power Converters Using Pulse-Width Modulation," *IEEE Applied Power Electronics Conference*, (IEEE Publication 88CH2504-9), pp. 33–40, 1988 Record, using as an example the buck converter. In order to obtain lossless zero-voltage switching at constant switching frequency, the active switch Q1 and rectifier diode D1 in a conventional buck converter shown in FIG. 3(a) are replaced with composite, current bidirectional switches S1 and S2 (realized in practice with MOSFET transistors) as shown in FIG. 3(b). Capacitors across both switches are included in order to model either device parasitic capacitance or externally added capacitor.

A soft-switching buck converter is obtained by using the composite switches S1 and S2 in the basic buck converter topology because lossless soft-transition (zero-voltage switching) in switches S1 and S2 occurs during the time intervals when both switches are turned off, and charge between their capacitors is exchanged in the resonant fashion, ideally without loss. By discharging capacitance across each switch just prior to it being turned on, lossless turn-on switching is provided. While the soft transition from the top switch S1 to the bottom switch S2 is inherently provided by the positive inductor current, transition from the bottom switch S2 to the top switch S1 requires a negative current source to oppose the positive load current flowing through the bottom switch S2. The simplest solution is to design the already existing output inductor $L_o$ such that its current is bidirectional with peak-to-peak magnitude greater than twice the dc load current for all operating conditions of interest as described in Henze, Martin and Parsley, supra. Inductor current waveform during the switching period shown in FIG. 4(a) and equivalent circuits of the converter during two different transition intervals shown in FIGS. 4(b) and 4(c) explain the soft-switching mechanism.

Even though the lossless switching can be achieved in this very simple manner, and voltage stresses on the switches are the same as in the basic PWM converter, the magnitude of the output inductor ripple current, $I_L$, has to be at least three to four times greater than the maximum load current in order to achieve soft-switching for all operating conditions, particularly at high switching frequency [Henze, Martin and Parsley, supra]. Practical application of such a converter is very limited due to serious drawbacks such as (a) increased conduction losses, (b) high core losses in the output inductor, (c) need for excessive additional output voltage filtering, particularly at high current levels, (d) limited range of the soft-switching frequency, particularly at higher switching frequencies (above 100 kHz), and (e) very low efficiency at light or no-load conditions. Moreover, by operating the converter without soft switching under certain input voltage and load conditions, the size of the EMI filter will be almost the same as in the basic PWM converter.

Another prior-art method, which achieves zero-voltage switching of switches on the primary side of a transformer operated with a constant switching frequency, is a phase-shifted, PWM, full-bridge converter described in R. A. Fisher, K. D. T. Ngo and M. II. Kuo, "A 500 kHz, 250 W Dc-Dc Converter with Multiple Outputs Controlled by Phase-Shifted PWM and Magnetic Amplifiers," *High Frequency Power Conversion Conference*, pp. 100–110, 1988 Record. Zero-voltage switching was made possible by using phase-shifted (four-state) PWM control, as opposed to the traditional (three-state) PWM control. The converter schematic and ideal waveforms are shown in FIG. 5 and FIG. 6, respectively. Primary side switches S1–S4 are composite switches realized in practice with MOSFET transistors. The inductance $L_1$ represented either leakage inductance of the transformer or externally added inductance required for one transition interval from passive to active state. Capacitances $C_{s1}$–$C_{s4}$ represent parasitic capacitances of the composite switches S1–S4, respectively.

Two switches in the same leg of the bridge (S1, S2 and S3, S4) are driven out of phase at 50% duty ratio with small dead-time $t_a$ and $t_b$, respectively, (FIG. 6). Their diagonally opposite switches, S4 for S1 and S3 for S2, are driven with delay (or phase shift θ) in respect to the corresponding switches S1 and S2 instead of in phase as in the conventional full-bridge converter. Output voltage is then regulated by varying the phase shift θ in drive signals of the primary side switches which results in pulse-width modulated voltage applied across the power transformer.

Two transitions, $t_a$, and $t_b$, which show ideal waveforms in a phase-shifted, full-bridge converter, are different in nature and duration and correspond to transition of the switches in the left leg (S1 and S2) and the right leg (S3 and S4) of the bridge, respectively. Zero-voltage switching (ZVS) is natural only during transition from active to passive state. Energy for charge displacement of the left leg switch capacitances, $C_{s1}$ and $C_{s2}$, is provided from the output inductor reflected to the transformer's primary, thus by the load current. On the other hand, zero-voltage switching transition from passive to active state, the right leg transition $t_b$, is not supported by the load current since the primary current is zero due to simultaneous conduction of the rectifier diodes D1 and D2. In order to provide soft-switching (ZVS) of the right leg switches, S3 and S4, it is necessary to have the inductance in series with the transformer's primary (inductance $L_1$ in FIG. 5). Energy needed for charge displacement of the right leg switch capacitances, $C_{s3}$ and $C_{s4}$, is stored in the series (leakage) inductance, $L_1$, during the active state when the output inductor current is reflected to the primary. In practice, the primary current decays exponentially during passive state (FIG. 6) due to resistance in its circulating path (transistors ON resistances and winding resistances), which further reduces available energy for the left leg transition.

The main drawbacks of the soft-switching, full-bridge converter are (a) there is no soft switching of the rectifier diodes, (b) limited range of zero-voltage switching of the primary side switches, (c) need for feedback isolation and (d) need for high leakage inductance. High leakage inductance has several disadvantages (a) it reduces overall converter efficiency since the leakage field in the transformer produces high eddy current losses in the windings, (b) it limits rate of the current change, di/dt, which results in reduction of the effective duty ratio $D_{eff}$ and consequently (c) increases primary conduction losses and voltage stress on the output rectifiers due to lower turns ratio required to compensate reduction in effective duty ratio.

Another prior-art method for increasing power density of dc-to-dc converters, particularly in applications where more than one output voltage is required, is to use a single power stage with multiple windings on the power transformer, one for each output voltage. In such a converter, all outputs share the same inverter stage, and only one output, called the main output, is fully regulated by pulse-width modulation of the inverter switches on the primary side. Such a solution then requires feedback isolation, and additional post-regulators are required for independent regulation of the auxiliary outputs against load variation.

One prior-art method uses magnetically controlled saturable reactors, commonly called magamps, as post-regulators due to some benefits as compared to other post-regulation techniques, namely (a) lower parts count, (b) more rugged, (c) more efficient, (d) less EMI noise and (e) lower current stress on the main inverter power switches.

A widely used topology which utilizes magamp post-regulators is a forward converter which requires only one magamp per output. A saturable reactor in a forward converter is reset during the flyback interval of the power transformer. Most of the magnetizing current remains in the primary during flyback of the transformer, and only a small portion is diverted to the secondary for reset of the saturable reactor. In practice, usually up to four magamps can be put in a typical forward converter with no adverse effect upon reset of the power transformer.

In symmetrical topologies (half-bridge, full-bridge and push-pull) unlike the forward converter, two magamps are required per output and the transformer's magnetizing current is not used for reset of the saturable reactors in post-regulators. In a half-bridge converter there is no flyback interval of the transformer, and each saturable reactor is reset during alternate pulses. The magnetizing current shifts to the secondary where it causes a series of problems which make a conventional half-bridge magamp converter less versatile than the forward converter. As a consequence of that, almost all half-bridge and other symmetrical topology with magamp post-regulators require a freewheeling diode, $D_F$, as shown in FIG. 7.

Without the freewheeling diode $D_F$, the currents in the main output secondary windings, $I_1$ and $I_2$, can be severely unbalanced right after the main switch is turned off. This is a consequence of the simultaneous conduction of both rectifiers, D1 and D2, which short the transformer during freewheeling interval. The situation is different when the main output is lightly loaded. Output inductor $L_2$ actually supplies power to both the main output and its own load and to the primary of the converter. Therefore, in any practical design of the conventional half-bridge converter (or any other symmetrical topology), the freewheeling diode $D_F$ is essential in the secondary with a magamp post regulator for proper mode of operation.

The freewheeling diode $D_F$ will keep only load current $I_{o2}$ of the total imbalance from being shifted to the main output, while the imbalance due to magnetizing current of the transformer still remains. In order to maintain continuous current in the main output inductor, which is required for preventing the auxiliary output from sag, it is necessary to provide a path for the magnetizing current. This can be done by (a) increasing minimum load on the main output or (b) providing a shunt path for the excess current. Both approaches reduce converter efficiency and increase converter complexity particularly when auxiliary output is used for supplying disk-drives and fans in computers.

Another undesirable effect is related to the energy stored in the magamp's saturated inductance which is damped back into the transformer at the end of each pulse. If this current, translated by the turns ratio, is greater than the main output's inductor current, the extra pulse will cause the main control loop to shrink the pulse width. As a consequence, the magamp's input pulse may then be inadequate and output voltage will drop.

Conventional half-bridge converter and idealized waveforms are shown in FIG. 8(a). Two equal capacitors C1 and C2 are connected in series across the DC power supply $V_g$ to enable an artificial mid-point $P_M$ to be created. Primary side switches S1 and S2 are driven alternatively during each switching period with duty ratio $D=\tau/T_s$. Full-wave rectification on the secondary side is provided by center-tapped secondary winding and rectifier diodes D1 and D2. The output voltage $V_o$ is regulated by varying duty ratio D. The transformer's turns ratio is assumed to be n=1.

One can distinguish two successive operating states, active and passive during each half of the switching period $T_s$ (FIG. 8(b)). During the active state $\tau$ the corresponding pair of the primary switch and rectifier diode (S1-D1 or S2-D2) conduct simultaneously so the primary voltage and current have the same polarity and the power is delivered from the source to the load. Positive voltage of magnitude $V_g/2$ is applied at the point A and energy is stored in the output inductor $L_o$. Contrary, during the passive state $t_d$, both primary side switches are OFF but the rectifier diodes (D1 and D2) conduct inductor current simultaneously and short the transformer. As a consequence of that both primary voltage and current are zero and no power is delivered from the source to the load. Energy stored in the output inductor during active state is now released into the load through the rectifier diodes. This operating state is also called freewheeling state due to the nature of energy transfer.

Soft-switching is not possible because the transformer is shorted by the rectifier diodes just after the one of the primary side switches (S1 or S2) is turned-off so both switches, S1 and S2 are connected instantaneously to the mid-point $P_M$ at voltage $V_g/2$ and stay there during deadtime $t_d$. In practice, the switches are implemented with bipolar transistors which have parasitic capacitance represented in FIG. 8(a) by capacitors in parallel with the switches. Thus, capacitors across the primary switches, charged at the $V_g/2$ during $t_d$, are therefore, discharged through the switches in lossy manner. It is therefore, necessary to prevent shorting of the transformer during freewheeling states. A search is therefore expected for the topologies which can provide soft-switching by using dc output inductor current with small or even no ripple current, instead of using high ripple, bipolar inductor current as in FIG. 4(a). Good candidates are transformer coupled converter topologies with full-wave rectification on their outputs, which naturally provide alternating current polarity to the primary switches before the beginning of transition intervals. In the following sections we describe the half-bridge converter which is the closest to the soft-switching buck converter from FIG. 3(b), but the same applies for the full-bridge and push-pull converters.

SUMMARY OF THE INVENTION

An objective of this invention is to provide a dc-to-dc converter with magnetic amplifiers which provide soft switching over a wide load range from no load to rated load for all switches with output voltage regulation control on the secondary side and constant switching frequency and duty ratio close to 50% on the primary side of an isolation transformer operation.

A primary objective is to eliminate the problems encountered in pulse width modulated (PWM) bridge-type switching converters, such as half bridge, full bridge and push-pull converters and many of their variants by providing an isolated switching converter with lossless soft switching for switches on both the primary side and the secondary side of a transformer and independent regulation of multiple outputs by use of magnetic amplifiers on the secondary side.

One objective is to eliminate the freewheeling or "catch" diode from the secondary side to enable simultaneous soft switching of primary and secondary side switches.

Another objective is to eliminate the problems associated with the class of soft-switching converters which require large inductive ripple current having peak to peak ripple higher than twice dc load current and to achieve soft switching in the present invention even with very small or zero inductive ripple currents by use of dc load current and natural current commutation capability of PWM half bridge, full bridge and push-pull converters.

A further objective is to implement the primary side switches with current bidirectional switches, such as MOSFETs, and drive them alternately at constant duty ratio close to 50% with a adjustable dead time $t_d$ in between and constant switching frequency.

Yet another objective is to replace the secondary side diode rectifiers with a controllable voltage bidirectional switches driven alternately with ideally 50% duty ratio and to delay the drive of the secondary switches with respect to the primary side switches by some controllable interval, thus providing voltage regulation on the secondary side via pulse width modulation of voltage bidirectional switches on the secondary side.

Other objectives are to use for current bidirectional switches on the primary side, either MOSFET transistors or bipolar transistors with externally added antiparallel diodes, and to use as voltage bidirectional switches on the secondary side magnetic amplifiers in series with diode rectifiers.

Another objective is to have magnetic amplifiers perform a three-fold role: provide secondary side voltage regulation and control, enable soft switching of the primary-side switches via proper drive timing, and eliminate the reverse recovery time problems associated with the secondary-side diode rectifiers of the PWM bridge type converters, all to eliminate the associated switching spikes and EMI noise as well as reduce losses.

Still another object is to eliminate the need for isolation in the feedback loop by controlling secondary-side switches only, and operating primary-side switches at a duty ratio close to 50%, thus resulting in a simple and cost-effective feedback control circuit.

Yet another objective is to provide a multiple-output switching converter with the independent regulation of each output and independent short circuit and overvoltage protection of each output.

Another object is to reduce the circulating current in the primary winding used for soft switching of the primary-side switches by use of the series connection of a saturable inductor and diode in place of a freewheeling diode.

These and other objects of the invention are achieved in a dc-to-dc converter having a transformer in which the primary-side switches S1 and S2 are composite, current bidirectional switches (such as MOSFET transistors, for example) and are driven alternately at a constant duty ratio close to 50% with adjustable dead time $t_d$ during which primary side switches are off. The use of a secondary-side freewheeling diode is eliminated and the half-wave rectifier diodes on the secondary side are replaced by controllable, voltage bidirectional switches S3 and S4, respectively. The switches S3 and S4 are driven alternately at ideally 50% duty ratio with pairs of switches S1, S3 and S2, S4 turning on at the same time in pairs, thus leading to two transition intervals during which S1 and S2 are both OFF. During a first transition interval, both primary switches S1 and S2 are open, but only one of the secondary-side switches is forced to conduct the dc load current, that is, S3 is closed and S4 is open. The transformer is therefore never shorted as in ordinary half-bridge converters, and the transformer primary current is maintained in the same direction during the dead time $t_d$ as it was before the primary switch S1 was turned OFF. Thus, this dc load current reflected to the primary side discharges parasitic capacitances $C_{S2}$ across switch S2 and transfers the charge to the parasitic capacitance $C_{S1}$ across switch. When capacitance $C_{S2}$ is discharged to zero volts, the further discharge is prevented by current bidirectional switches and voltage across is clamped to zero. The subsequent turn on of S2 at zero voltage results in ideally zero switching losses.

The primary current, being reflected dc load current, naturally changes polarity between two transition intervals. Soft switching is thus naturally provided during the second transition interval when S3 is open and S4 is closed. Soft switching of the primary side switches, unlike in other soft-switching converters, is not dc load current dependent and requires no large inductive current ripple to perform the charge transfer between the two parasitic capacitances.

The output voltage regulation is provided by modifying the secondary voltage bidirectional switch drives. The secondary side switches S3 and S4 are still driven out-of-phase with fixed 50% duty ratio, but their drive signals are delayed by variable time with respect to original drive waveforms. The soft switching of the primary switches is preserved, but regulation of the output voltage is also achieved via PWM by controlling this delay time.

The controllable voltage bidirectional switches S3 and S4 on the secondary may be implemented in several ways, namely using transistors in series with the diode or by use of the magnetic amplifier acting as a switch in series with the rectifier diode. The magnetic amplifier implementation results in additional advantage of eliminating the problems associated with the reverse recovery current of the secondary rectifier diodes in the prior-art PWM half bridge, such as additional losses, voltage and current spikes and EMI noise, while soft switching and secondary side load regulation are still preserved. Thus, the choice of the magnetic amplifier in this invention provides three advantages: facilitates soft switching of the primary-side switches, enables soft switching of the secondary-side switches, and allows secondary-side load regulation.

This invention can be practiced with equal ease on PWM full-bridge and push-pull switching converters with similar advantages, provided the power converter topology is modified according to one outlined for the half-bridge configuration.

BRIEF DESCRIPTION OF THE DRAWINGS

FIG. 4(a) is a waveform diagram of a bidirectional current source in the circuit of FIG. 3(b), and FIGS. 4(b) and 4(c) illustrate equivalent circuits for two transition intervals of the circuit in FIG. 3(b).

FIGS. 12(a), 12(b) and 12(c) illustrate waveforms useful in understanding how output voltage regulation is provided by delaying drive signals for secondary-side switches S3 and S4 in respect to the drive signal S1 for the circuit of FIG. 9.

FIG. 21(a) shows waveforms of the secondary voltage $V_{S1}$ on scale 100 volts per division (top trace), primary current on scale of 4 amperes per division (trace #2), secondary current $I_{S1}$ on scale of 4 amperes per division (trace #3) and voltage $V_A$ on scale 100 volts per division (bottom trace) with time on the scale 1 µsec per division, obtained at nominal load current of 4 amperes in a prototype of the circuit shown in FIG. 15, while

DETAILED DESCRIPTION OF THE INVENTION

Figure 8A:
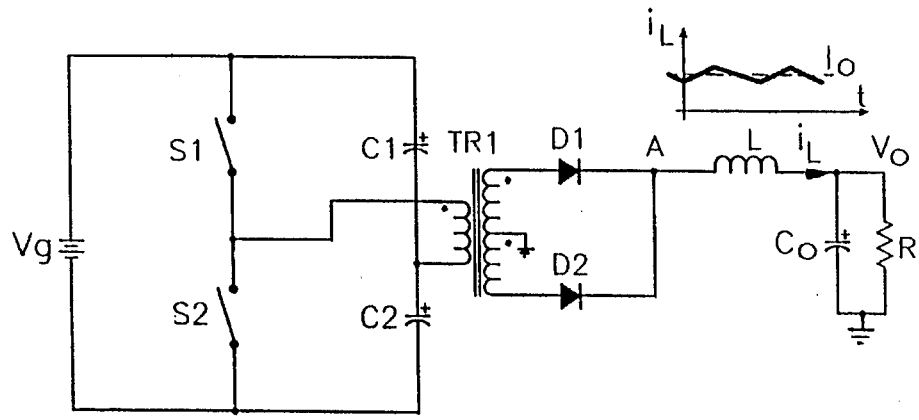
FIG. 8(a) is a circuit diagram of a conventional half-bridge converter on which the present invention may be practiced.
Figure 9:
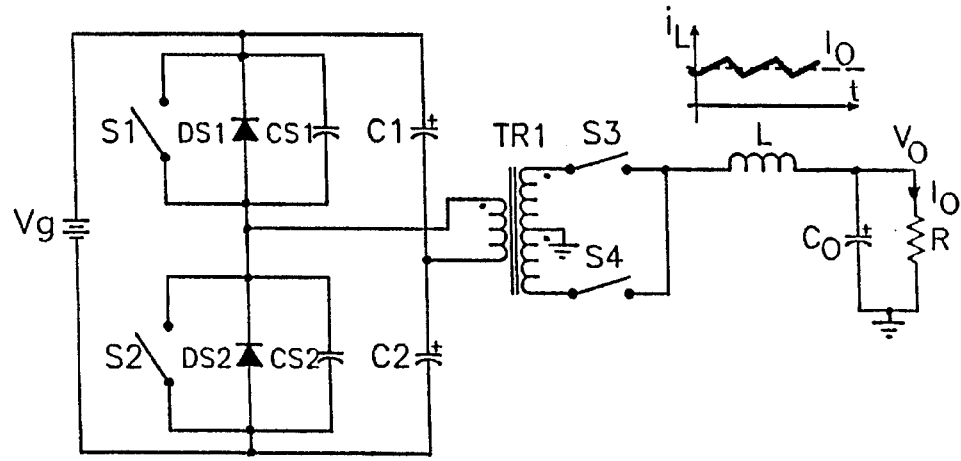
FIG. 9 is a circuit diagram of a soft-switching half-bridge circuit in accordance with one aspect of the present invention.
Figure 10:
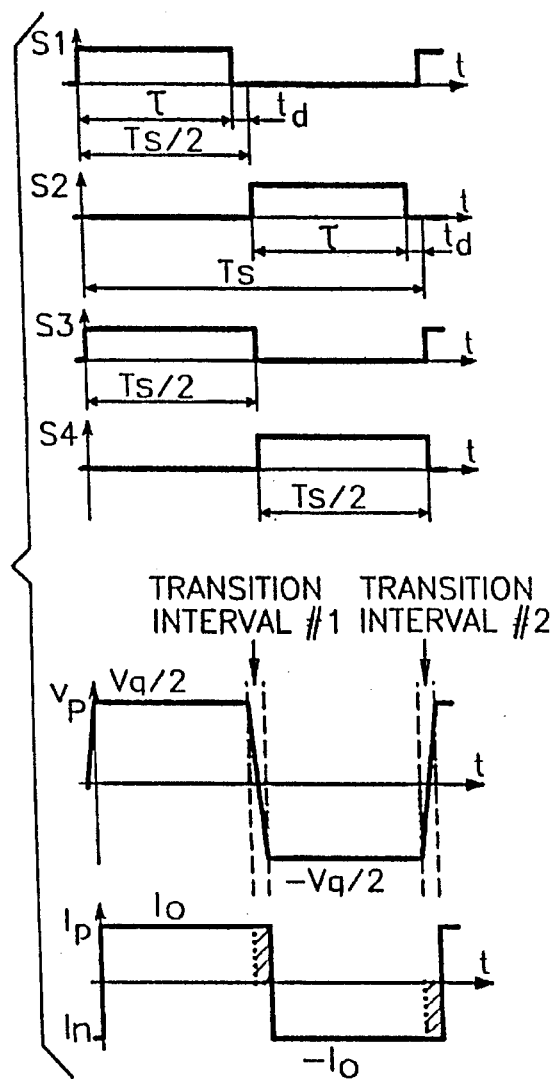
FIG. 10 illustrates idealized waveforms during a switching period of the soft-switching half-bridge circuit of FIG. 9.

A soft-switching half-bridge converter which overcomes the problems of the prior art is shown in FIG. 9. There are four main differences between topology of the present invention and a conventional half-bridge converter shown in FIG. 8(a):

a) Primary side switches S1 and S2 are composite, current bidirectional switches (MOSFETs);

b) Primary side switches are driven alternatively at duty ratio close to 50% with adjustable dead-time $t_d$ (FIG. 10);

c) Rectifier diodes D1 and D2 are replaced with controllable, voltage bidirectional switches S3 and S4, respectively; and d) Output voltage is PWM regulated by controlling the secondary side switches instead of the primary side switches Both soft-switching of the primary side switches S1 and S2, and output voltage regulation are obtained by using voltage bidirectional switches S3 and S4 with appropriate drives.

Soft-Switching Mechanism

Figure 11A:
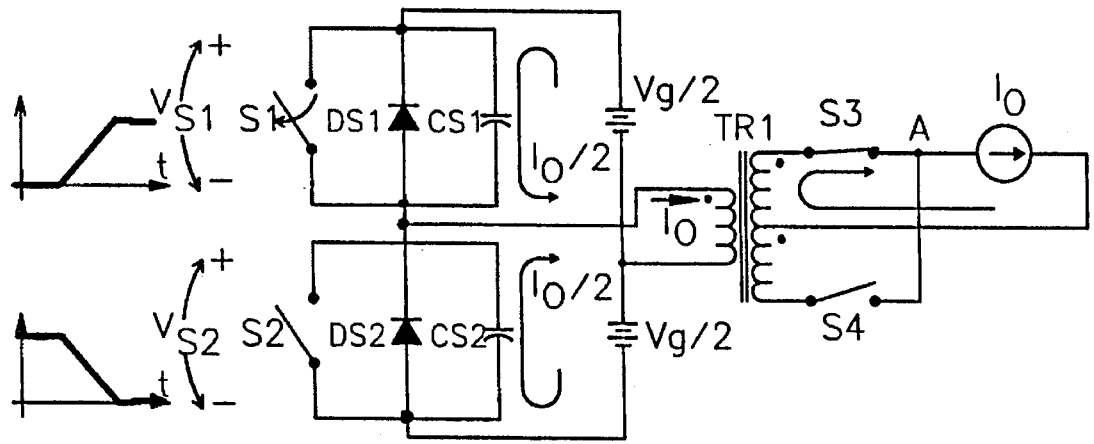
FIGS. 11(a) and 11(b) illustrate equivalent circuits for two transition intervals of the circuit in FIG. 9.
Figure 11B:
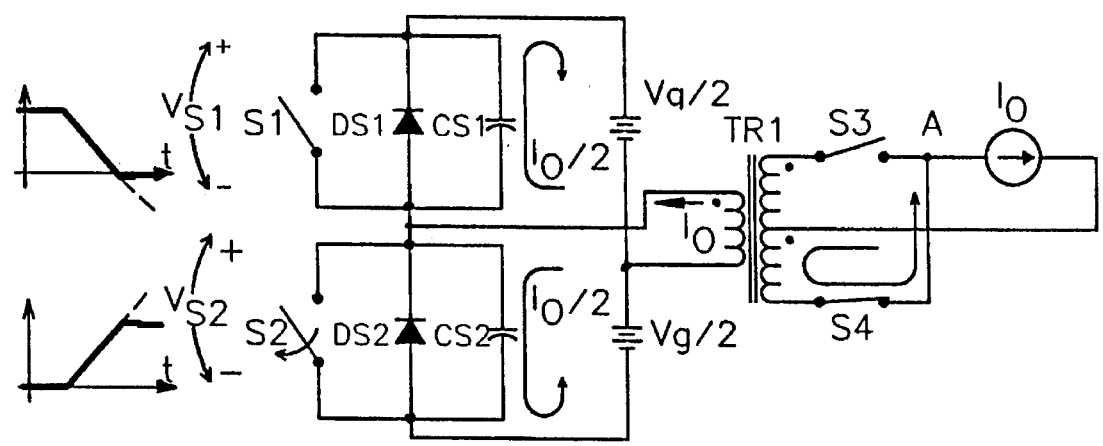

Idealized waveforms during a switching period and equivalent circuits of the converter during two transition intervals are shown in FIG. 10 and FIG. 11, respectively. The output inductor $L_o$ is assumed to be infinitely large so it is replaced with constant dc current source $I_o$ in the equivalent circuits in FIGS. 11(a) and 11(b). Primary side switches, S1 and S2, are driven alternately at a duty ratio close to 50% with small dead-time $t_d$, while the secondary side switches are driven alternately at exactly 50% duty ratio. During transition interval #1 both primary switches are OFF but only one of the secondary side switches is forced to conduct the load current (S3 closed and S4 open as in FIG. 11(a)). The transformer is therefore never shorted, and primary current is maintained in the same direction during dead-time as it was before the primary switch is turned-OFF (dashed area in the primary current waveform in FIG. 10), so the soft-transition of the primary side switches is naturally provided as shown in FIG. 11(a). Primary current, being reflected dc load current $I_o$, naturally changes polarity between two transition intervals. Thus, soft-switching is also naturally provided during transition interval #2 when S3 is open and S4 is closed as in FIG. 11(b).

The first transition interval is initiated by turning-off the top switch S1. Voltage and current in the primary of the transformer are both positive. Since switch S3 is still turned-on, reflected inductor current to the primary is positive and splits between two capacitors CS1 and CS2 as shown in FIG. 11(a). Capacitor CS1, previously discharged to zero level, is now linearly charging toward positive voltage as shown by dashed line. At the same time, capacitor CS2, previously charged to source voltage $V_g$, is linearly discharging until zero level is reached. At that moment, the diode DS2 starts to conduct and clamps voltage on the bottom switch S2 at zero, and consequently, voltage on the top switch S1 at $V_g$, as shown by the solid lines. During this transition, voltage on the transformer's primary changes polarity from positive value $+V_g/2$ to a negative value $-V_g/2$ while the primary current is maintained positive by the switch S3 on the secondary side. Bottom switch S2 can now be turned-ON at zero-voltage with no switching loss, which completes the first transition interval. Switch S3 is turned-off and switch S4 is turned-on, which allows the transformer's primary current to be negative and in phase with primary voltage. After this, converter behavior is the same as in conventional half-bridge PWM converter.

The second transition interval starts by turning-OFF the bottom switch S2. Voltage and current in the primary of the transformer are both negative. Since switch S4 is still turned-ON, reflected inductor current to the primary is negative and splits between two capacitors CS1 and CS2 as shown in FIG. 11(b). The capacitor CS2, previously discharged to zero, is now charging linearly toward the positive voltage, and the capacitor CS1, previously charged to source voltage $V_g$, is discharging until zero level is reached. The diode DS1 starts to conduct and clamps voltage on the top switch S1 at zero and, consequently, voltage on the bottom switch S2 at $V_g$. During this transition, voltage on the transformer's primary changes polarity from negative value $-V_g/2$ to positive value $+V_g/2$ while the primary current is maintained negative by the switch S4. The top switch S1 is turned-ON at zero-voltage after time $t_d$. At the same time, switch S4 is turned-OFF and switch S3 is turned-ON, which allows the transformer's primary current to be positive and in phase with primary voltage. After this, behavior of the converter is the same as in the conventional half-bridge PWM converter.

Transition between primary side switches is under the same scenario as described for the buck converter (FIG. 4) with the only difference in the commutating current. Since in this case, the commutating current is reflected load current to the primary, both transitions are natural and equal (FIG. 10).

Comparison of Soft Switching Mechanisms

Figure 1A:
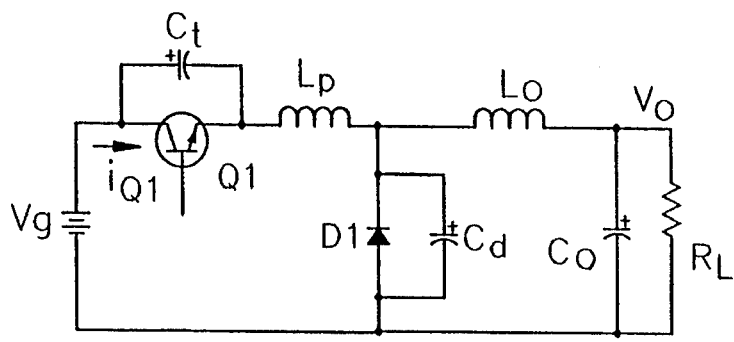
FIG. 1(a) is a circuit diagram of a conventional buck converter.
Figure 1B:
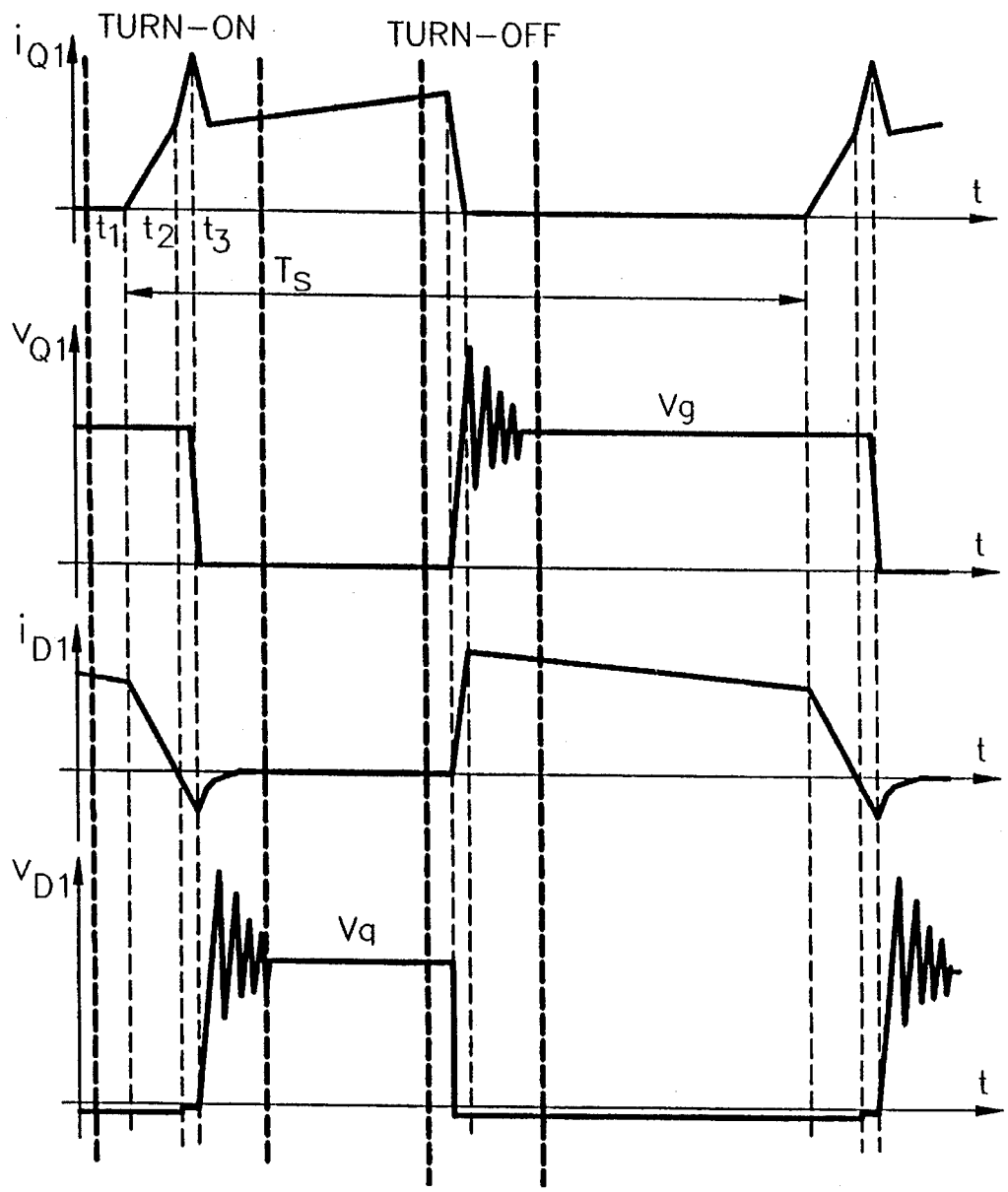
FIG. 1(b) is a diagram of typical waveforms of currents and voltages for switches Q1 and D1 in the circuit of FIG. 1(a).
Figure 2:
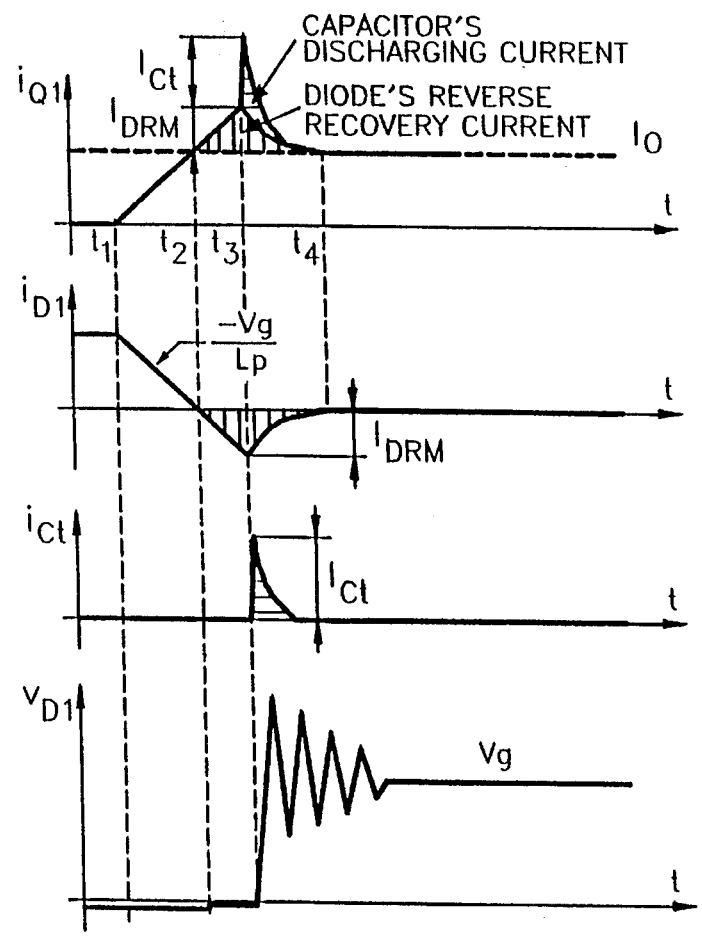
FIG. 2 is a diagram of waveforms for the operation of the switches Q1 and D1 and capacitor C1 in respect to the capacitors discharging current and the diodes reverse recovery current during the diodes turn-off during the turn-on transition of the power switch Q1.
Figure 3A:
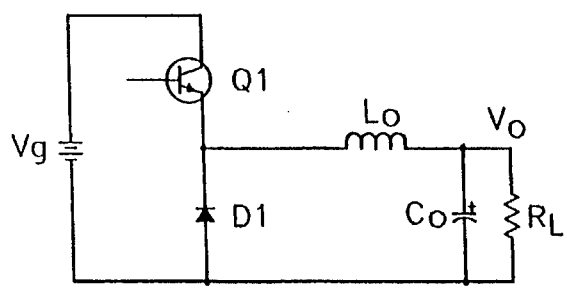
FIG. 3(a) is a circuit diagram of a basic buck converter and FIG. 3(b) is a circuit diagram of a prior-art soft-switching buck converter obtained by using composite switches S1 and S2 for switches Q1 and D1 in the basic buck converter.
Figure 3B:
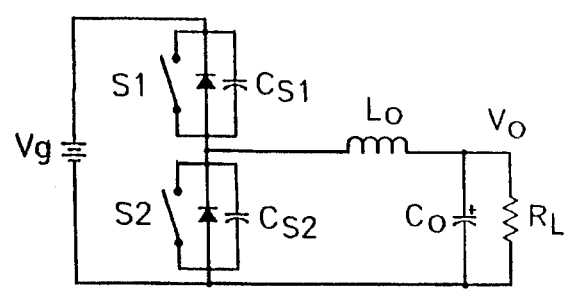
Figure 5:
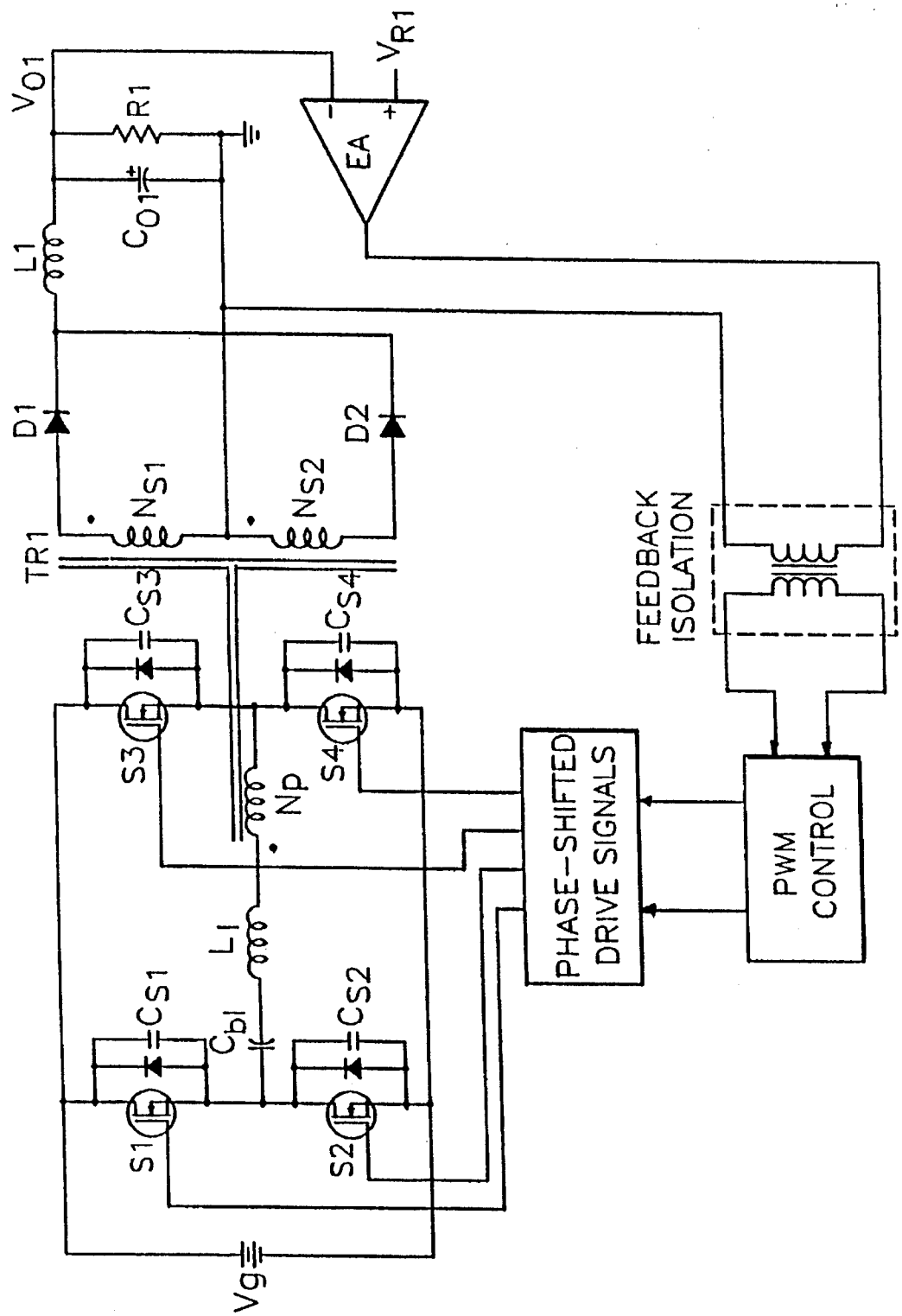
FIG. 5 is a circuit diagram of a phase-shifted, PWM, full-bridge converter.
Figure 6:
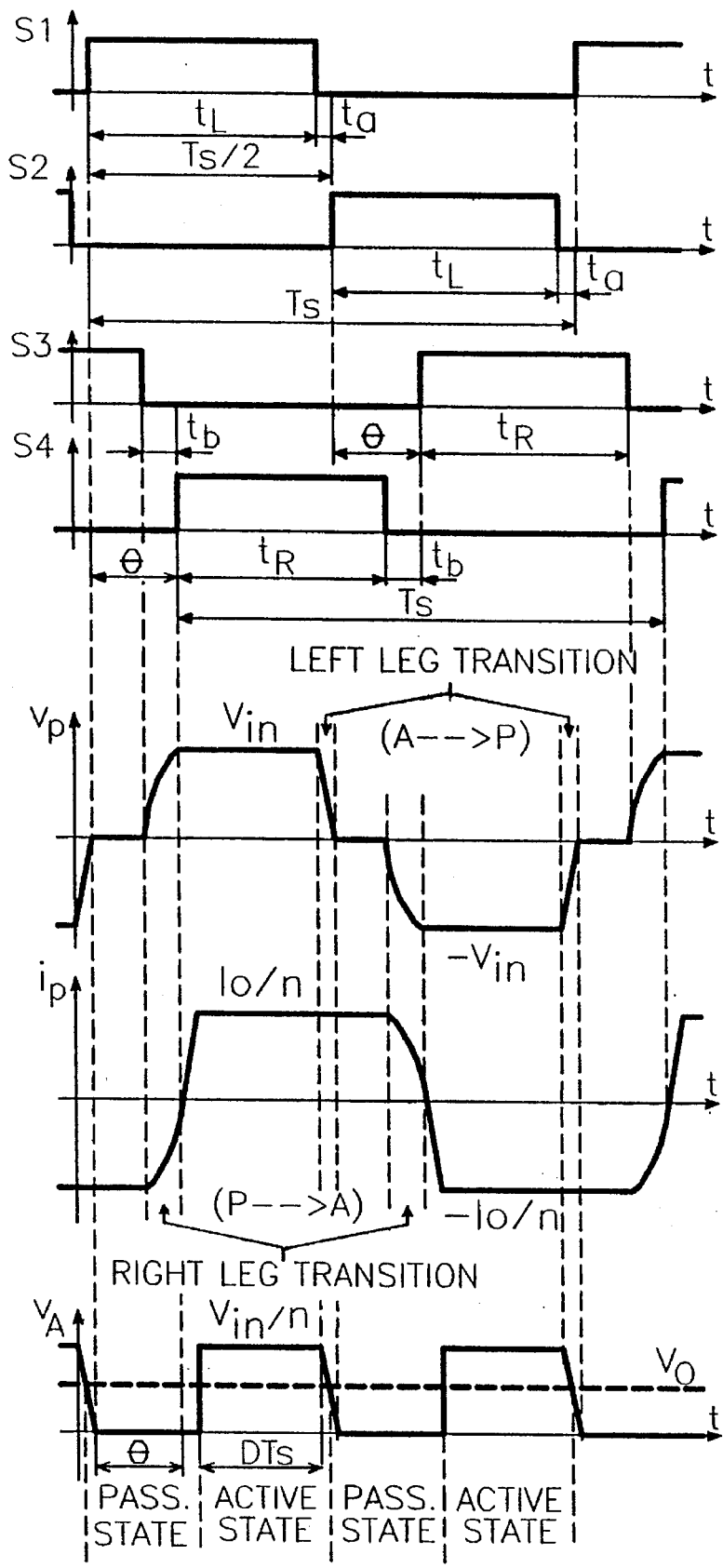
FIG. 6 is a diagram of ideal waveforms for the circuit of FIG. 5.

The main, and very important difference between two previously described soft-switching mechanisms is in the commutating current. Soft-switching mechanism in the half-bridge converter, even though similar to that in the buck converter, uses transformer's inherently bidirectional primary current (reflected DC load current) (FIGS. 10, 11(a) and 11(b)) instead of the bipolar triangular inductor current with large ripple (FIG. 4(a)). As a consequence of that, conduction losses in the switches, copper losses in the windings, and core losses in the output inductor, having (almost) DC current, are also reduced compared to the soft-switching buck converter (FIG. 3(b)). Moreover, duration of the transition intervals are the same compared to other solutions in which turn-on and turn-off transitions can differ an order of magnitude, unless some additional circuitry is added. Proposed soft-switching mechanism is also different from the solution which uses the transformer's magnetizing current for soft-switching. The main disadvantages of this solution are (a) magnetizing current needs to be relatively large to keep transition intervals short, (b) freewheeling diode is essential for the soft-switching. Note that the proposed soft-switching half-bridge converter operates without need for freewheeling diode.

Output Voltage Regulation

The main drawback of the described soft-switching half-bridge converter from FIG. 9 is that there is no output voltage regulation if the secondary side switches are driven as shown in FIG. 10. In order to provide the output voltage regulation it is necessary to vary duration of the interval during which voltage $V_A$ is negative, which occurs when the primary voltage and current are out of phase. The secondary side switches S3 and S4 are still driven out of phase with fixed 50% duty ratio but their drive signals are delayed by variable time θ shown in FIG. 12(c) with respect to original drive waveforms shown in FIGS. 12(a) and 12(b).

Figure 8B:
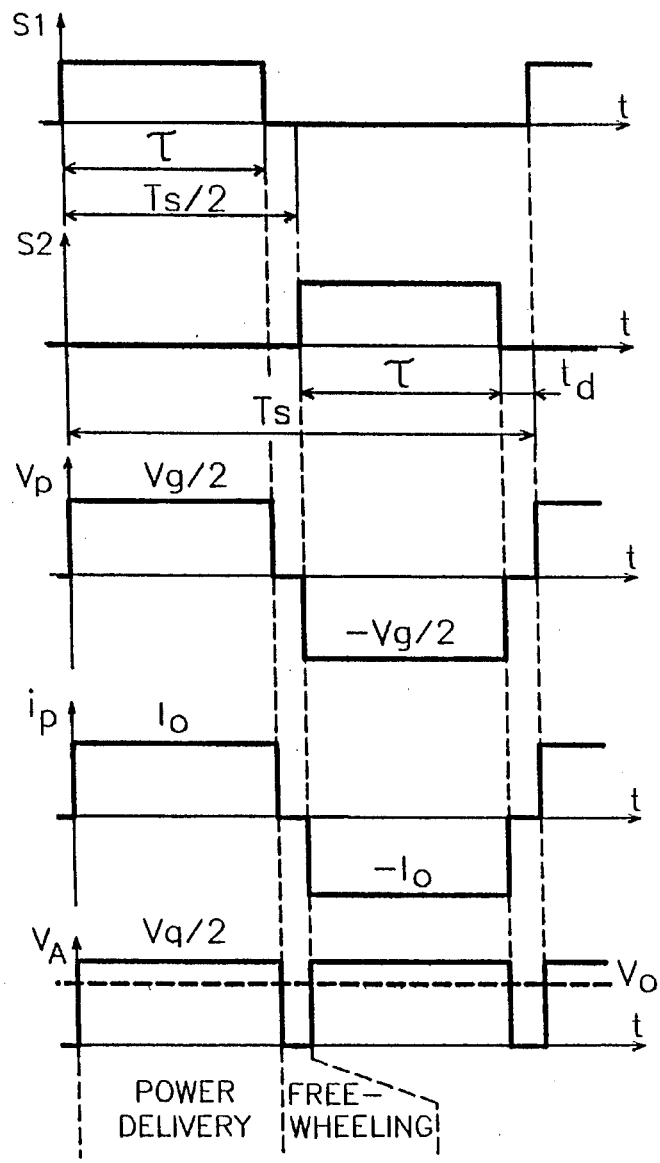
FIG. 8(b) illustrates idealized waveforms used to explain operation of the conventional half-bridge converter.
Figure 13:
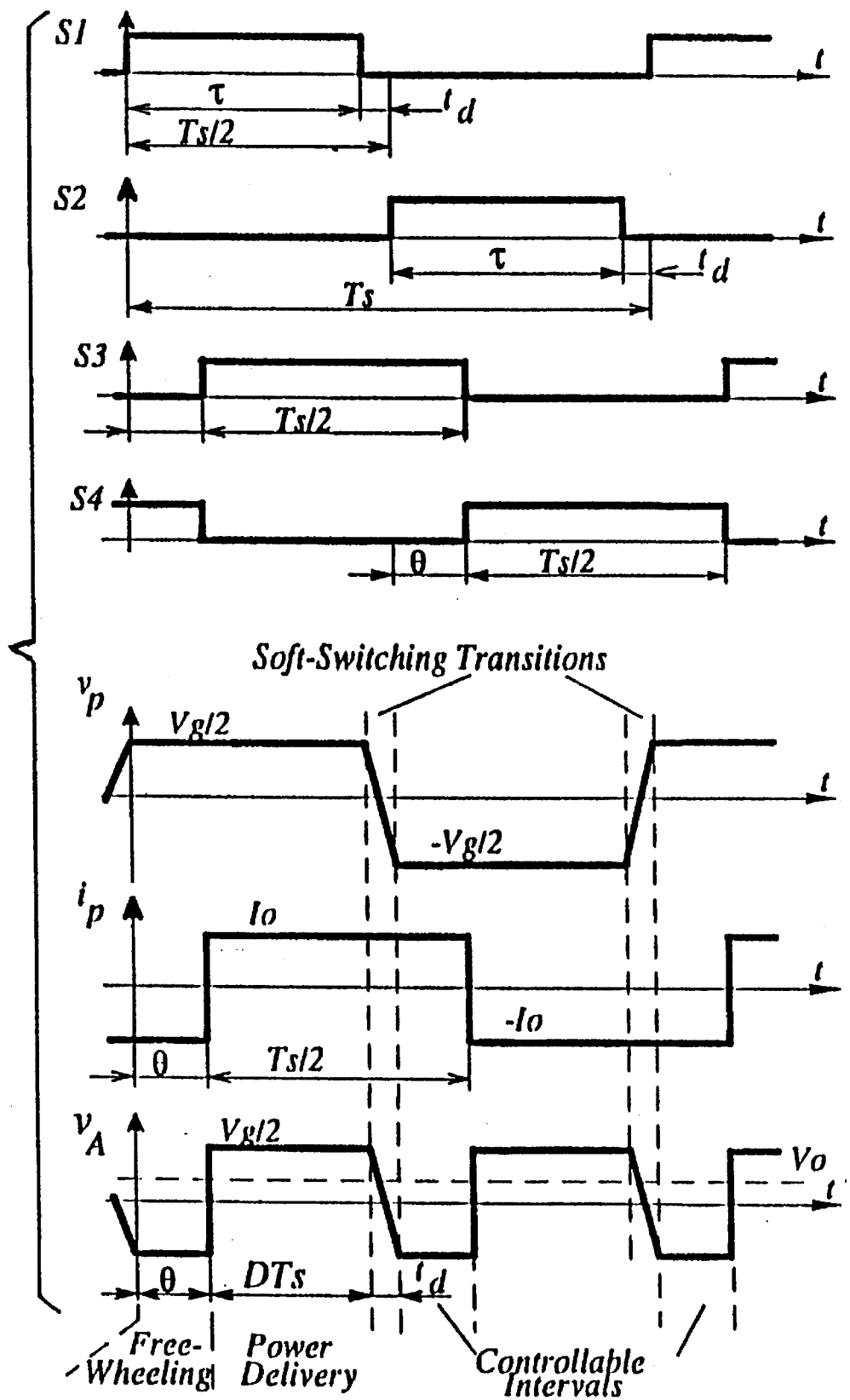
FIG. 13 illustrates idealized waveforms in the soft-switching half-bridge converter of FIG. 9.

In addition to the active and passive states in the conventional converter (FIG. 8) there is soft-transition state $t_d$ in the new converter (FIG. 9) which separates the passive from the active state during half of a switching period as shown in FIG. 13. While the active states in the converter of FIG. 9 are the same as in conventional half-bridge converter, the behavior of the new converter is completely different during the passive, freewheeling state. During the active states τ–θ, the corresponding pair of the primary and secondary switches (S1–S3 or S2–S4) conduct simultaneously providing power deliver from the source to the load. Contrary, during the passive states θ, primary side switch conducts simultaneously with opposite secondary side switch (S1–S4 or S2–S3) making the transformer's voltages and currents out of phase so that the load current circulates through the primary circuit and negative voltage is applied at the input of the output inductor (point A). Soft-transition states exist only between the active and the passive states, while transition from the passive to the active states are instantaneous.

The output voltage regulation is therefore, achieved by varying duration of the passive states which corresponds to delay time in the drive signals of the secondary side switches S3 and S4. Duty ratio of the converter is defined as a portion of the switching period during which both voltages and currents in the transformer windings have the same polarity, i.e.:

$$D = 2\frac{\tau - \theta}{T_S} \quad (1)$$

The output voltage is average value of the voltage $V_A$ at the input A, and in continuous conduction mode of operation (CCM) is given by:

$$V_o = V_A(2D-1) = V_g(D-0.5) \quad (2)$$

Switch Realization

Figure 14A:
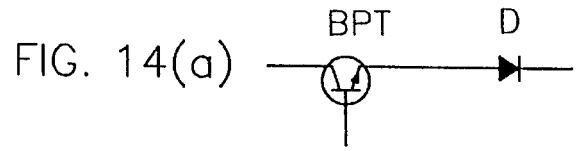
FIGS. 14(a), 14(b) and 14(c) illustrates three practical realizations of the voltage bidirectional switches S3 and S4 in the soft-switching half-bridge converter of FIG. 9.
Figure 14B:
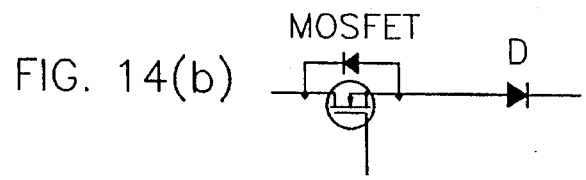
Figure 14C:

The primary current bidirectional switches, S1 and S2, are realized in practice by MOSFET transistors. On the other hand, there are three options for practical realization of the voltage bidirectional switches S3 and S4 on the secondary side of the converter as shown in FIGS. 14(a), 14(b) and 14(c). Among them, realization with controllable saturable reactor SR, used for magnetic amplifier, in series with the diode D shown in FIG. 14(c) is chosen due to several advantages such as:

a) there is no reverse-recovery problem during diode's turn-OFF so parasitic oscillations and voltage spikes in the diode voltage are significantly reduced, b) EMI noise generation is reduced and overall converter efficiency is improved, and c) control of the saturable reactor is very simple and does not require any synchronization with primary side switches nor complex control and drive circuits.

Saturable reactors are widely used in series with rectifier diodes as magnetic snubbers and "spike-killers." Due to non-linear, square-loop magnetic characteristic, saturable reactor behaves as a switch. In saturation it behaves as a short circuit while out of saturation it represents a large inductance. By applying current of the opposite polarity, as is the case during diode's turn-OFF, saturable reactor runs out of the saturation at very small negative current and becomes large inductance which limits di/dt of the reverse current through the diode. By this action turn-off losses in the diode are minimized, and parasitic oscillations and voltage spikes are significantly reduced.

Extended Range of Soft-Switching

The common limitation for all zero-voltage switching topologies is the minimum load current at which zero-voltage switching is lost. Different techniques have been proposed for extending the range of zero-voltage switching but they require some additional resonant inductor, complex control circuitry or active circuit.

Figure 19:
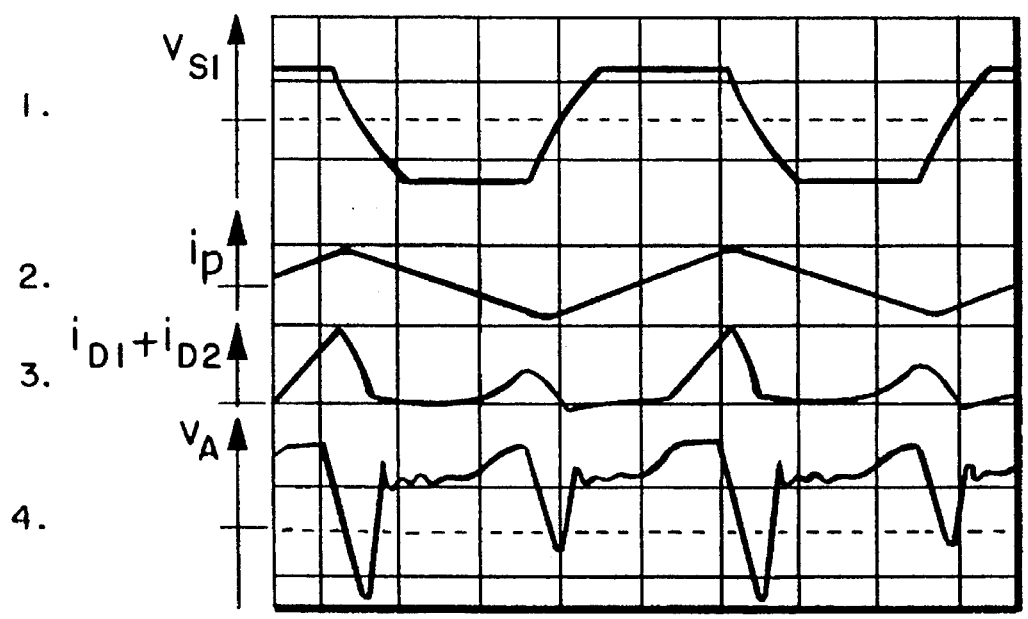
FIG. 19 shows waveforms of the secondary voltage $V_{S1}$ on a scale 100 volts per division (top trace), primary current on scale of 1 ampere per division (trace #2), current in the common lead of both secondaries on scale of 0.5 amperes per division (trace #3), and voltage $V_A$ on a scale 100 volts per division (bottom trace) with time on the scale 1 µsec per division, all obtained at 2% load current (0.1 amperes).
Figure 22:
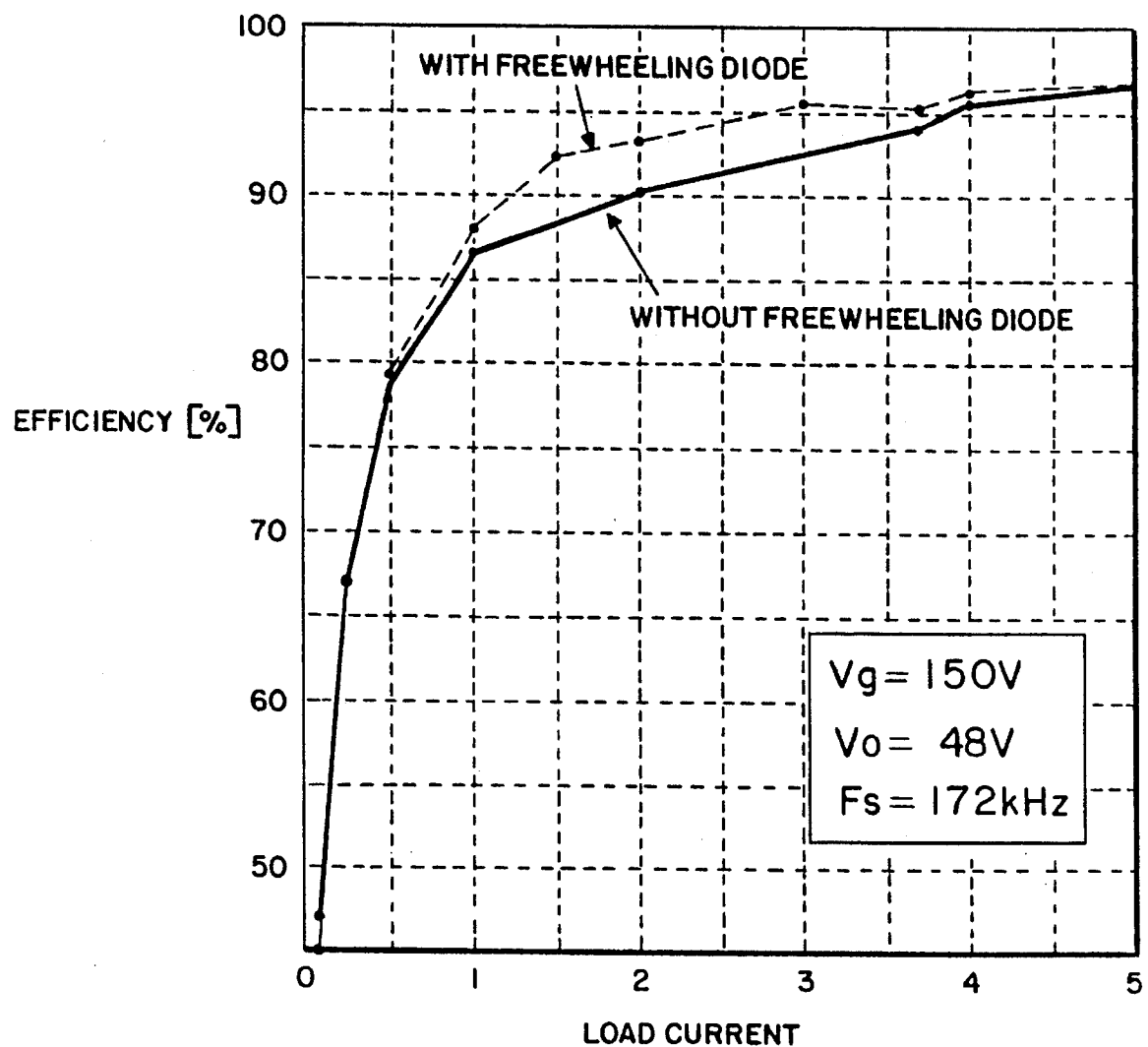
FIG. 22 is a waveform diagram showing power stage efficiency as a function of the load current in a half-bridge converter.

The proposed converter can provide zero-voltage switching even at no load by increasing the dead-time $t_d$ in drive signals of the primary side switches S1 and S2 (FIG. 10), and with proper design of the magnetizing inductance as shown in FIG. 19. Since converter operates in discontinuous conduction mode at light loads, reduction in the effective duty ratio due to increase in dead time will not affect output voltage regulation. Moreover, reset current and flux swing in the core of the magnetic amplifiers are simultaneously reduced due to reduction in the effective duty ratio. As a consequence of that, power consumed by the control circuit and core losses in the saturable reactors are reduced so the total efficiency of the converter is improved at light loads as shown in FIG. 22.

Reduction of Circulating Current

Figure 17:
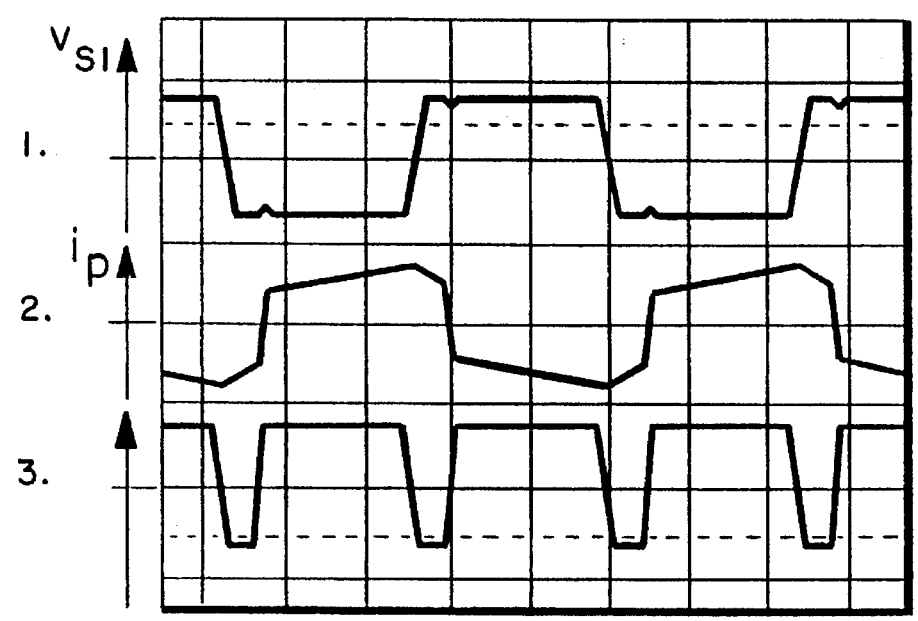
FIG. 17 shows waveforms of the secondary winding voltage $V_{S1}$ on a scale 100 volts per division (top trace), primary current on a scale of 4 amperes per division (middle trace) and voltage $V_A$ on a scale 100 volts per division (bottom trace) with time on the scale 1 µsec per division, all obtained at load current of 4 amperes.

Circulating current in the primary circuit during freewheeling period θ (FIG. 13) results in higher conduction losses and needs to be minimized. By inserting freewheeling diode in series with small non-controllable saturable reactor, it is possible to reduce circulating primary current as shown in FIG. 17. Conduction of the freewheeling diode is delayed by the saturable reactor blocking capability for the time interval slightly longer than the resonant transition in the primary voltage is finished. In this manner, circulating current flows in the primary circuit only during transition interval $t_d$, while after that freewheeling diode conducts. This solution improves total efficiency of the converter as shown in FIG. 22 with price paid for the additional diode and small saturable inductor.

Circuit Description

Figure 15:
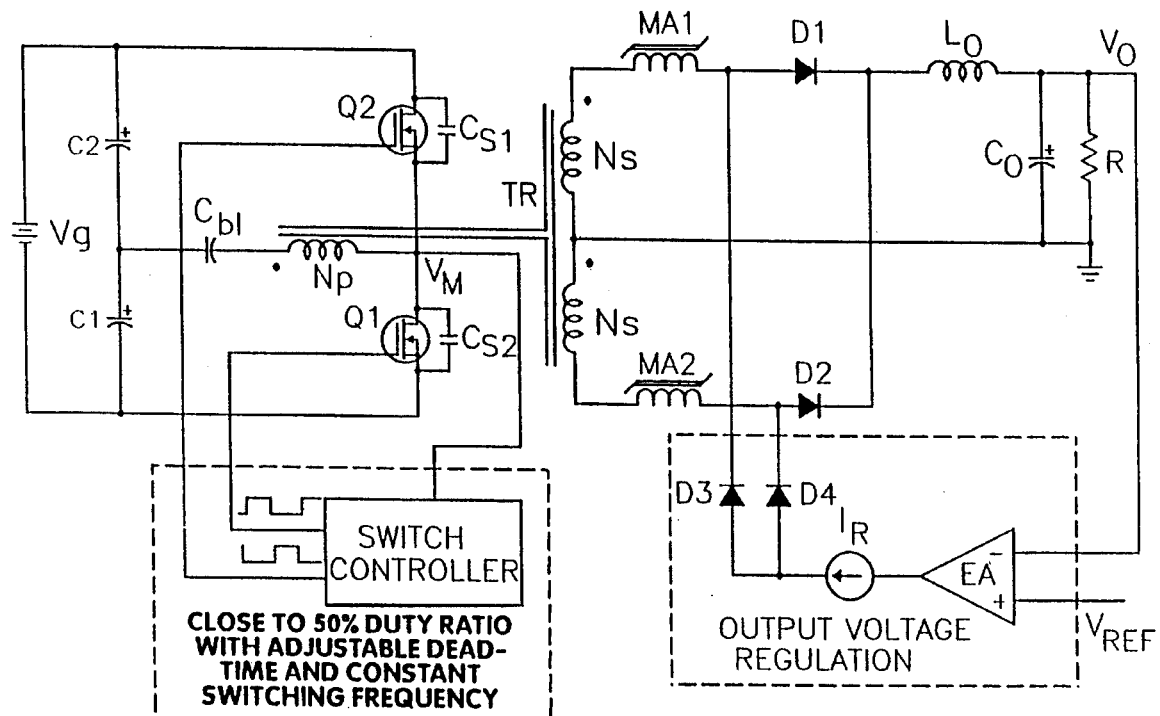
FIG. 15 is a circuit diagram of a soft-switching half-bridge converter with magnetic amplifiers in accordance with the present invention with full realization of all its objectives and advantages.

Schematic of the novel soft-switching half-bridge converter is shown in FIG. 15. Two equal capacitors C1 and C2 are connected in series across the dc power source $V_g$ to enable an artificial mid-point $P_M$ to be created. Primary side, current bidirectional switches, are connected in series between two rails of the input voltage source $V_g$ and realized with MOSFET transistors Q1 and Q2. For higher power levels, external capacitors could be added across the transistors Q1 and Q2 in order to slow down dv/dv of their drain-to-source voltages during the switching transitions. Isolation transformer TR is designed with magnetizing inductance small enough to provide zero-voltage switching at light loads, or even no load conditions as described above under the heading "Extended Range of Soft Switching." There is no requirement for small leakage inductance as in the PWM parent converter, which together with small magnetizing inductance simplify transformer design. Blocking Capacitor $C_{b1}$ is connected in series with primary $N_p$ of the power transformer TR in order to prevent saturation of the transformer. The centered tapped secondary has two windings with an equal number of turns $N_s$. The secondary side, voltage bidirectional switches are realized with saturable inductors MA1 and MA2 in series with rectifier diodes D1 and D2. Saturable inductors MA1 and MA2 are realized on the magnetic core having square-loop characteristics but also magnetic materials with soft saturation characteristics, such as ferrite materials, can also be used. The output inductor $L_o$ is designed to have usually 20–30% current ripple as in the parent, conventional PWM converter. Output capacitor $C_o$ filters out high-frequency ripple current from the output inductor and provides dc output voltage.

The control circuit on the primary side is realized with a standard PWM chip with complementary outputs so the MOSFETs Q1 and Q2 are driven at constant switching frequency and close to 50% duty ratio with small dead-time. Voltage at common point of the transistors Q1 and Q2, $V_M$, is sensed and used to delay turn-ON of the each transistor if the soft transition is not finished during dead-time $t_d$. The sense circuit compares voltage $V_M$ with two voltage levels, zero and $V_g$, and enables turn on of the transistor only at zero voltage. In this way, soft switching is preserved for all operating conditions as described in the heading "Extended Range of Soft Switching." The control circuit for the magnetic amplifiers is simple and consists of the error amplifier E/A and current source $I_R$. The output voltage $V_o$ is compared with the reference $V_{ref}$ in the error amplifier E/A. The output of the E/A then controls the current source $I_R$ which is used for the reset of the saturable inductors, MA1 and MA2. In this way, duration of the passive state θ is adjusted to keep the output voltage constant. A very important advantage of this secondary and primary side control is that there is inherently isolation of the voltage feedback signal. Nothing further is required to isolate the secondary feedback control from the primary and vice versa.

Components used in the prototype are listed bellow:
Transistors: Q1, Q2=IRF640
Diodes: D1, D2=16CFP20
IC1=UC3846; E/A=LM358
Magnetic amplifiers: MA1, MA2-30T on core MB 18×12× 4.5 (Toshiba)
Capacitors: C1, C2=470 μF, $C_{b1}$=2.2 μF; Co=2×220 μF, CS1, CS2=680 pF.
Output inductor: $L_o$=42 μH
TR: core-LP 32/13; Np=18T, Ns=9T.

Experimental Verification

Experimental waveforms obtained in 250 W, 48 V prototype operated at 200 kHz from 300 Vdc are shown in this section to demonstrate feature of the proposed soft-switching half-bridge converter.

Figure 16:
FIG. 16 shows waveforms of the drain-to source voltage of the MOSFET transistor Q1 on a scale 100 volts per division (top trace), and the primary current on a scale of 2 amperes per division with time on the scale of 1 µsec per division (bottom trace), both obtained in a prototype of the circuit shown in FIG. 15 operating at 200 kHz for converting 200 watt power at 48 volts.

Transistor voltage and the primary current of the isolation transformer are shown in FIG. 16 for load current of 4 amperes. As can be seen MOSFET voltage in trace 1 is trapezoidal and free of spikes and parasitic oscillations. Primary current in trace 2 is reflected load current and delayed in respect to the voltage by approximately 500 ns, thus providing soft switching of the MOSFET. Both waveforms are in good agreement with idealized waveforms from FIG. 13.

The secondary winding voltage, primary current and voltage $V_A$ waveforms, taken for load current of 4 A, are shown in FIG. 17 to verify predicted waveforms from FIG. 13. As can be seen, during freewheeling state current waveform is delayed in respect to the voltage waveform, voltage $V_A$=−75 V and inductor current linearly decays. During active state, voltage and current are in phase, voltage $V_A$=75 V and inductor current linearly rises.

Figure 18:
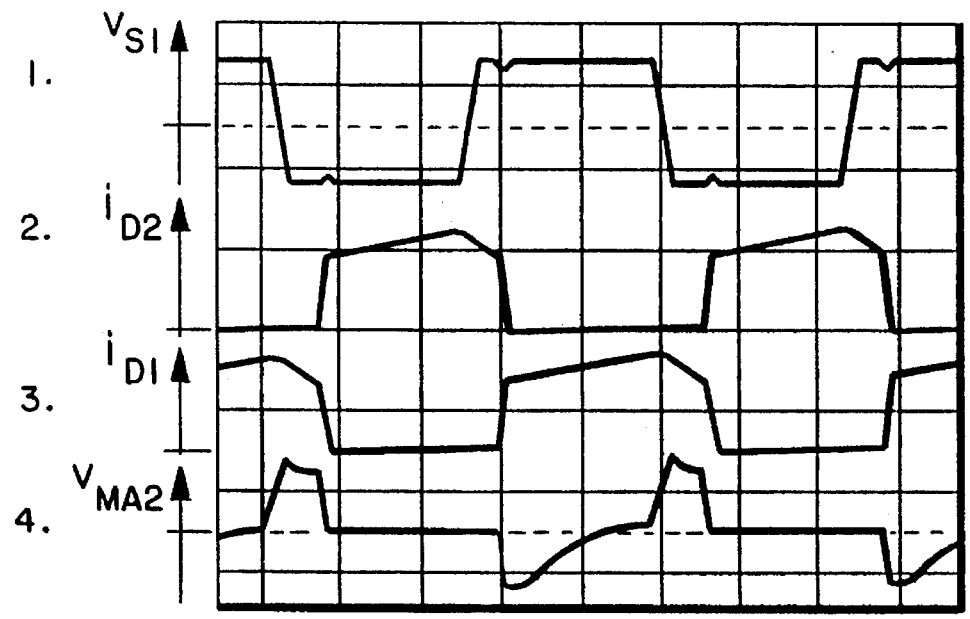
FIG. 18 shows waveforms of the secondary winding voltage $V_{S1}$ on a scale 100 volts per division (top trace), current in rectifier diode D2 on scale at 4 amperes per division (trade 2), current in rectifier diode D1 on scale 4 amperes per division (trace 3) and voltage on magnetic amplifier MA2 on scale 100 volts per division (bottom trace 4), with time scale of 1 µsec per division, all obtained at load current of 4 amperes.

The secondary winding voltage, $V_{S1}$, currents in both rectifier diodes, $I_{S1}$ and $I_{S2}$, and voltage across the saturable inductor MA1 are shown in FIG. 18 to confirm proper operation of the magnetic amplifiers. For simplicity only the voltage waveform of one saturable inductor is shown. Saturable inductor MA1 blocks secondary voltage during 500 ns (bottom trace) and diode in opposite secondary, D2, is still conducting load current (trace #3). Once the core of the saturable inductor MA1 is saturated, the corresponding series diode, D1, is turned on and conducts the load current (trace #2) while the diode in opposite secondary winding, D2, is turned-off. Saturable inductor MA1 is reset during the active state of the diode in opposite secondary, D2. Very clean, spikes-free current waveforms in both secondary diode rectifiers, $I_{S1}$ and $I_{S2}$, confirm soft-switching of the rectifier diodes provided by saturable inductors, MA1 and MA2, respectively.

Salient waveforms in the converter at only 2% load current (0.1 A) are shown in FIG. 19. Voltage waveforms of the secondary voltage (top trace 1) confirms that soft-switching is still preserved. As one can seen from the current waveform in the common lead of both secondaries (trace 3), converter operated in DCM. The asymmetry in current pulses (trace 3) as well as in the voltage $V_A$ waveform (bottom trace 4) are both due to different turn-off characteristic of the rectifier Diodes, D1 and D2, and different core material characteristics of the saturable inductors MA1 and MA2. The primary current (trace 2) is dominated by the magnetizing current of the isolation transformer. Dead-time is increased to 1 µs thus, allowing that resonant transition between magnetizing inductance and MOSFETs capacitances is completed before the transistor is turned-on.

Figure 20:
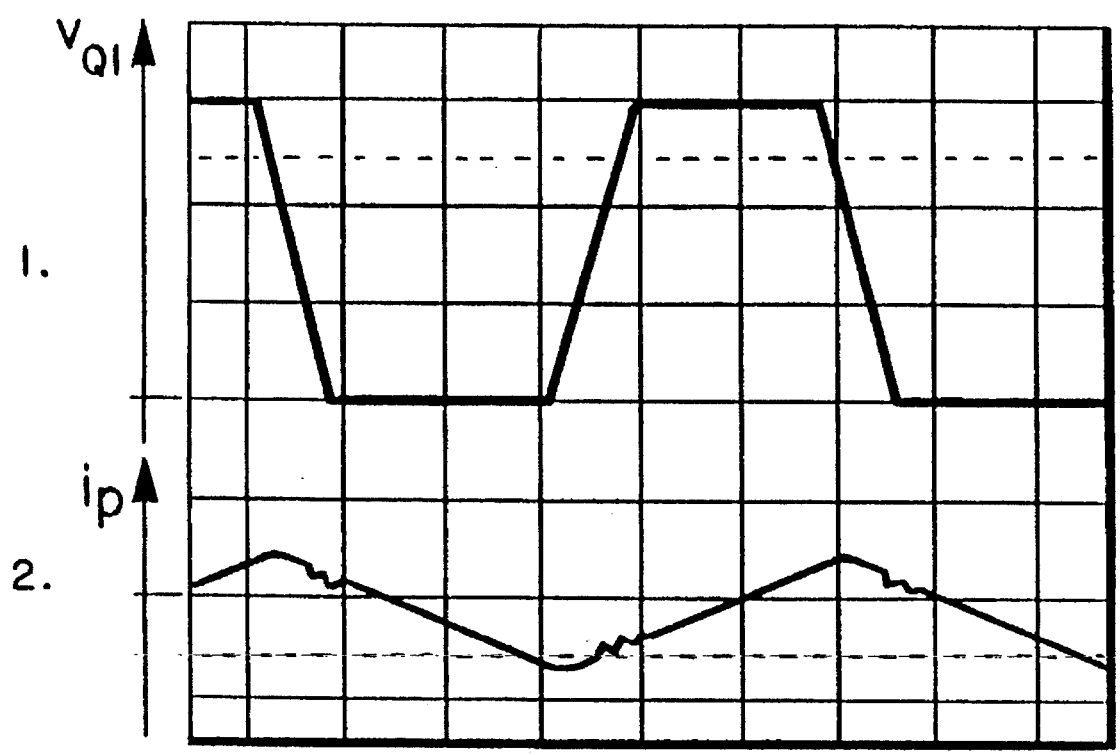
FIG. 20 shows waveforms of the drain-to source voltage of the MOSFET transistor Q1 on a scale 100 volts per division (top trace), and the primary current on a scale of 1 ampere per division with time on the scale of 1 µsec per division at 2% load current (0.1 amperes) but with fixed dead-time, td, of 600 nsec.

For comparison, transistor voltage and primary current waveforms taken at 2% load current without adjustment of dead-time are shown in FIG. 20. Resonant transition is longer than dead time and hard switching occurred at approximately 70% of the transistor's nominal voltage. In addition, parasitic oscillations are evident in both voltage and current waveforms.

Figure 21A:
Figure 21B:
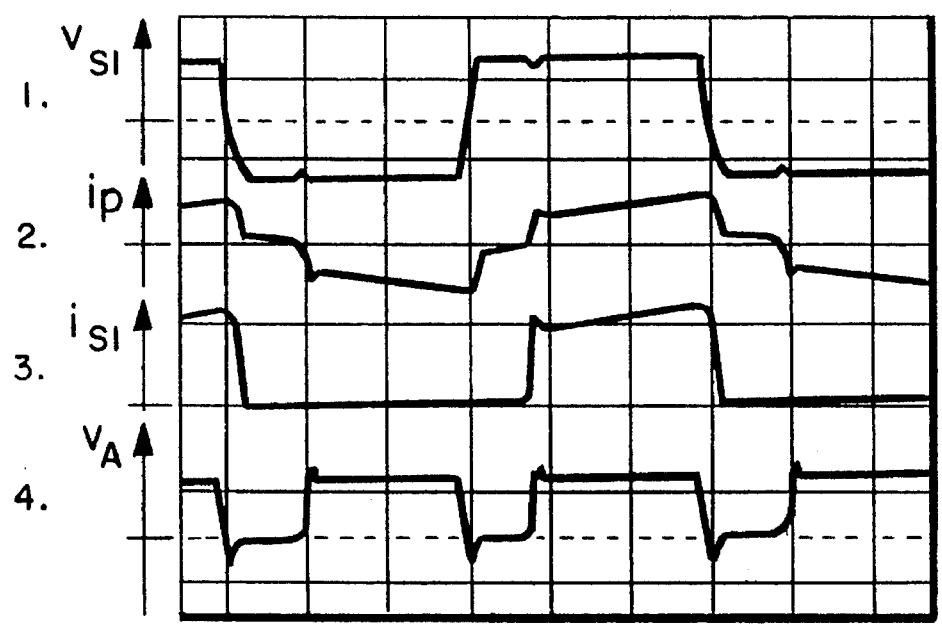
FIG. 21(b) shows the same waveforms under the same conditions but with freewheeling diode in series with saturable reactor connected between point A and the output return in the same prototype circuit.

In order to verify reduction of circulating current, salient waveforms shown in FIGS. 21(*a*) and 21(*b*) are taken at nominal load (4 amperes) before and after the freewheeling diode DF and saturable inductor are added between second ground and point A (FIG. 15). Primary current (trace 2), as well as secondary current $I_{S1}$ (trace 3), drops to zero after soft-transition in the secondary voltage $V_{S1}$ is completed (top trace 1) of FIG. 21(*b*) instead of circulating through the primary circuit as shown in FIG. 21(*a*). Voltage $V_A$ (bottom trace 4) is clamped by the freewheeling diode at zero during the freewheeling state (FIG. 21(*b*)) instead of at $-V_S$ (FIG. 21(*a*)).

Figure 7:
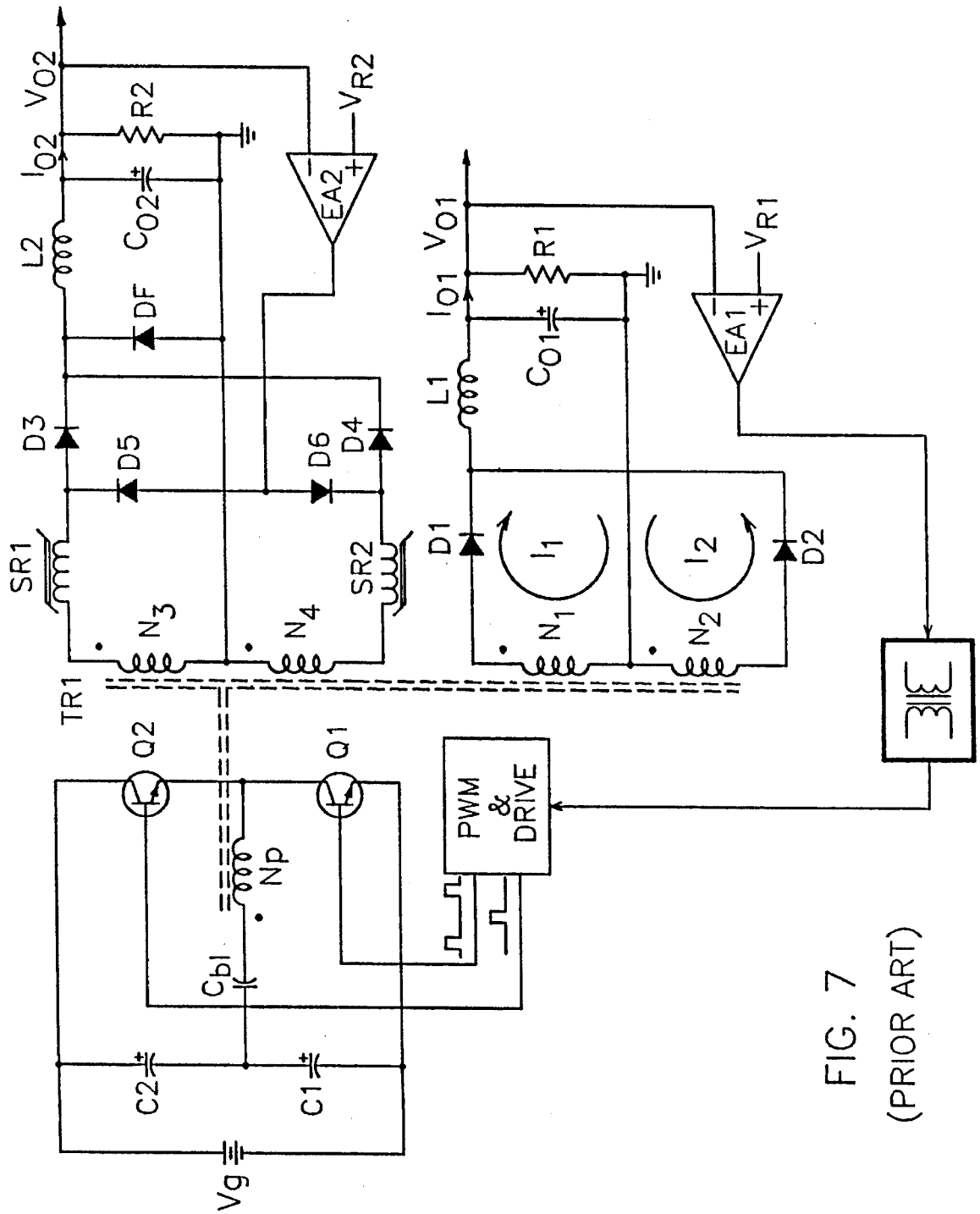
FIG. 7 is a circuit diagram of a prior-art half-bridge converter using magamp post-regulation in multiple output applications requiring a freewheeling diode $D_F$ in the auxiliary output.

Efficiency is measured on the prototype first, without and then with a freewheeling diode DF like that shown in FIG. 7 and a saturable reactor in series as in the prior art. Power stage efficiency for both cases is plotted in FIG. 22 as a function of the load current. By adding a freewheeling diode in series with a saturable reactor, the maximum increase in efficiency of 3% was measured at 50% load current. Power consumption of both control circuits was fairly constant and measured 0.98 W which is only 0.5% of the nominal power of 200 watts.

Figure 23:
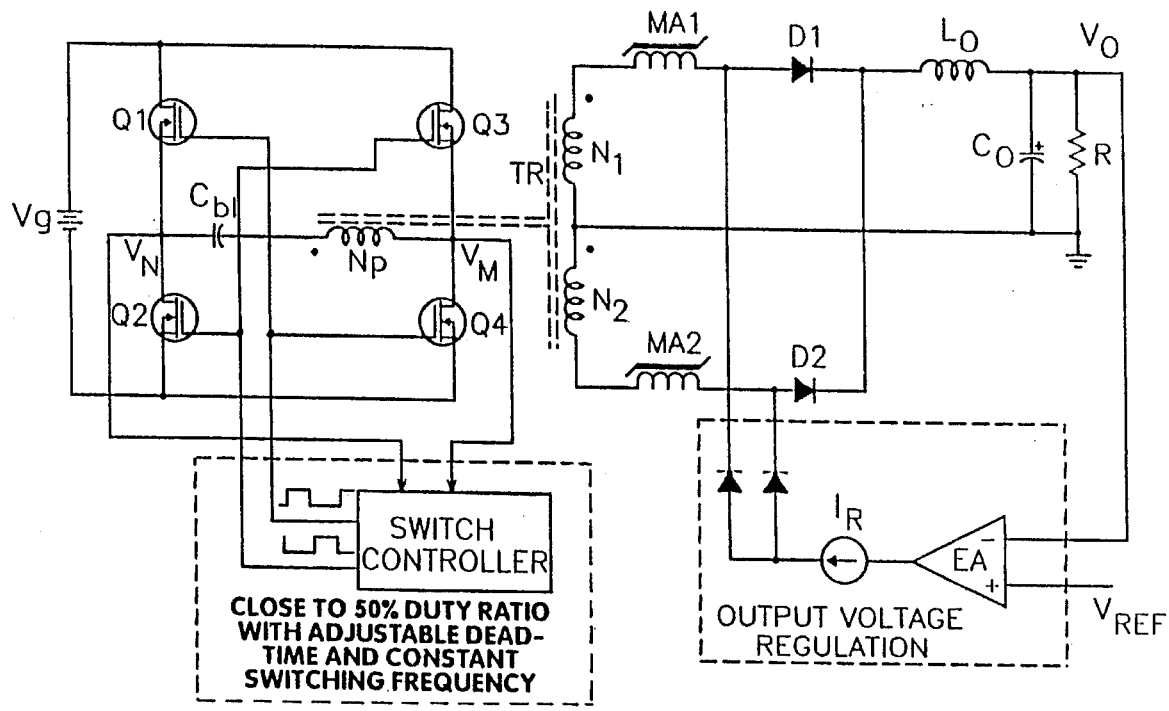
FIG. 23 is a circuit diagram of a soft-switching full bridge converter with magnetic amplifiers in accordance with the present invention with full realization of all its objectives and advantages.
Figure 25:
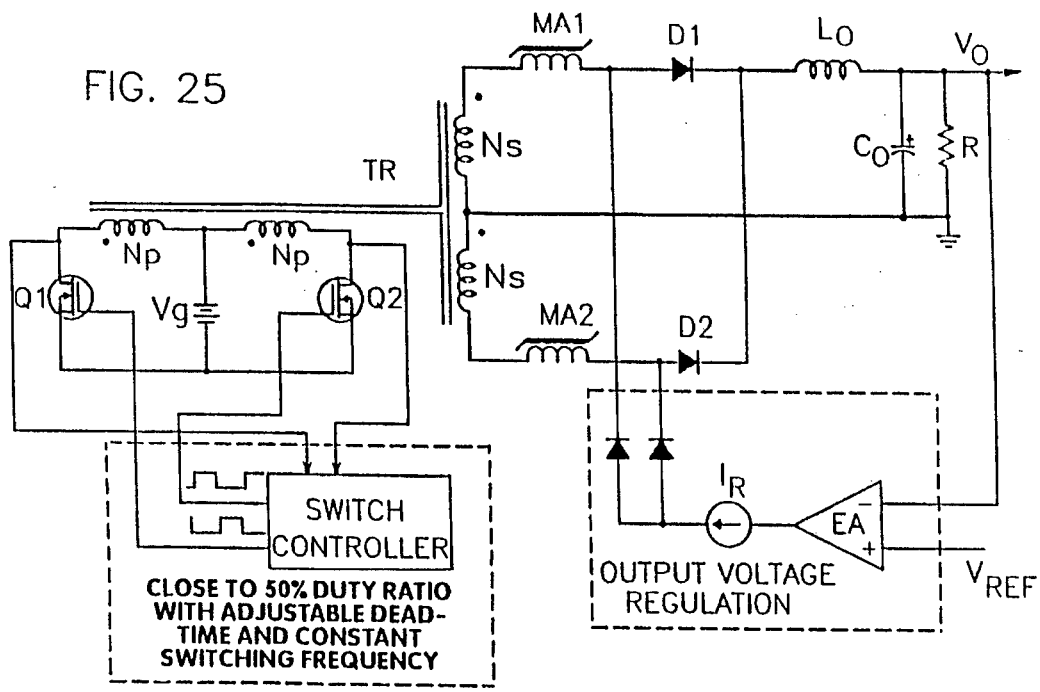
FIG. 25 is a circuit diagram of a soft-switching push-pull converter with magnetic amplifiers in accordance with the present invention with full realization of all its objectives and advantages.

The novel soft-switching mechanism can also be used in other symmetrical converter topologies, such as full-bridge and push-pull converters shown in FIG. 23 and FIG. 25, respectively. The only difference between these three soft-switching converters is in their input power stages, while the secondary circuits as well as the primary side control circuits are the same.

The soft-switching full-bridge converter shown in FIG. 23 has four composite, current bidirectional switches Q1 through Q4 preferably implemented with MOSFET devices. They are paired such that two diagonal switches of the bridge Q1, Q4 and Q2, Q3 are driven simultaneously with a close to 50% duty ratio and with adjustable dead time between the turning on of one pair and turning off of the other pair for zero-voltage switching but out-of-phase with the other pair of diagonal switches. Two voltages $V_N$ and $V_M$ are sensed to guarantee this dead time for zero-voltage switching under all operating conditions.

Figure 24:
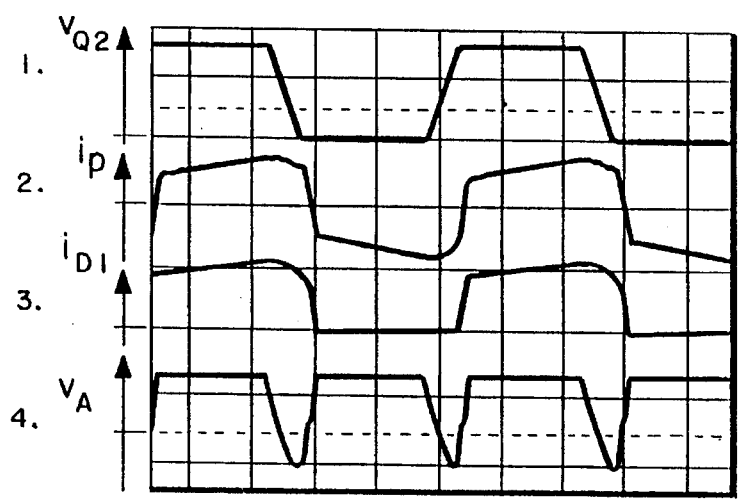
FIG. 24 shows waveforms of the drain-to source voltage of the MOSFET transistor Q2 on a scale 200 volts per division (top trace), the primary current on a scale of 2 amperes per division (second trace), current on diode D1 on scale of 5 amperes per division (trace #3), and voltage $V_A$ on a scale 100 volts per division (bottom trace), with time on the scale of 1 µsec per division, all obtained in a prototype of the circuit shown in FIG. 23 operating at 200 kHz for converting 250 watt power at 48 volts.

Experimental waveforms of the drain-to-source voltage of the switch Q2, the primary current, current of the rectifier diode D1, and voltage $V_A$ obtained in a prototype of the circuit shown in FIG. 23 (operated at 200 kHz for converting 250 watt power at 48 volts) are shown in FIG. 24. As can be seen, transistor voltage (top trace 1) is trapezoidal and free of spikes and parasitic oscillations. Primary current (trace 2) is reflected load current and delayed in respect to the voltage by approximately 500 ns, thus providing soft switching of the MOSFET switches. Very clean, spike-free current waveforms in the rectifier diode D1 (trace 3) and voltage $V_A$ waveform (bottom trace 4) confirms soft turn-off switching of the diode and effective voltage snubbing by the magnetic amplifier.

In the case of the push-pull converter shown in FIG. 25, MOSFET transistors Q1 and Q2 are driven as described for soft-switching switches Q1 and Q2 in the half-bridge converter shown in FIG. 15. In order to provide soft switching for all operating conditions, both transistor voltages have to be sensed. These two signals are then fed into a switch controller which adjusts for dead time in the drive signals for Q1 and Q2 to ensure zero-voltage switching under all operating conditions. Both zero-voltage switching of transistors Q1 and Q2 on the primary side of the converter circuit and soft turn off of the rectifier diodes D1 and D2 on the secondary side are provided and voltage and current waveforms are identical to those for the half-bridge converter (FIGS. 16–21) and the full-bridge converter (FIG. 23).

Figure 26:
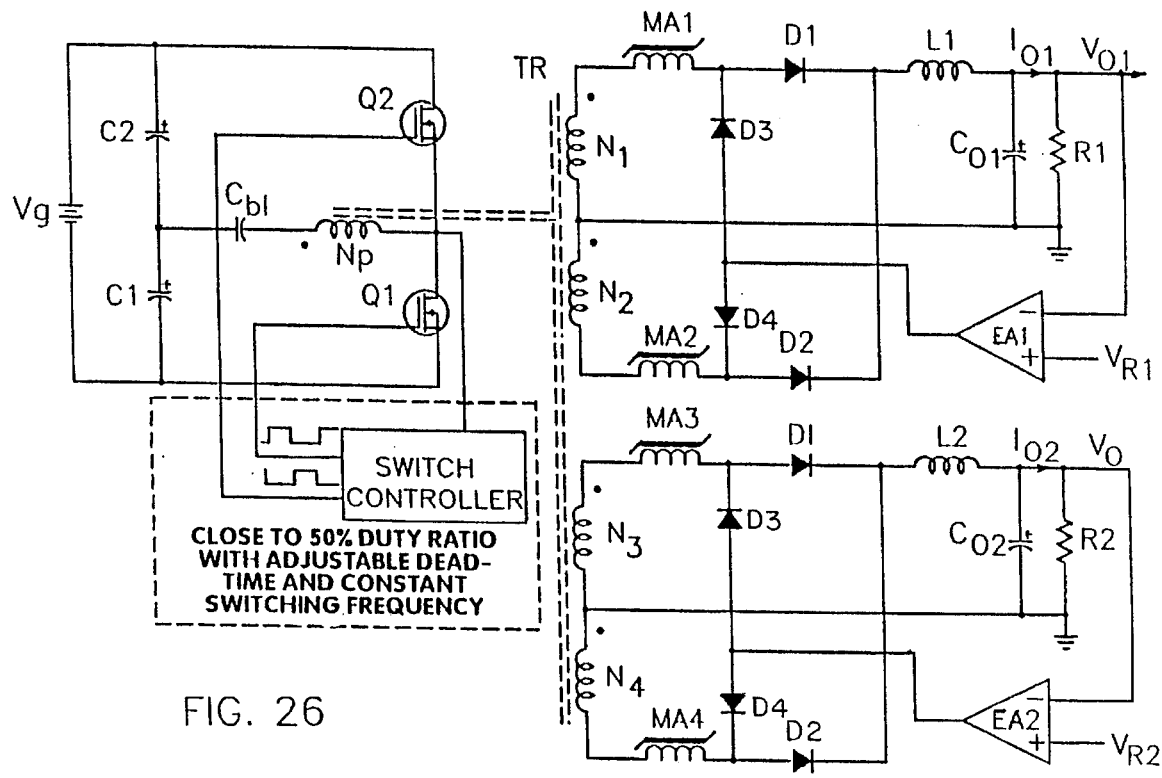
FIG. 26 is a circuit diagram of a soft-switching half-bridge converter with two independently controlled outputs with magnetic amplifiers in accordance with the present invention with full realization of all its objectives and advantages.

All three soft-switching topologies, half-bridge, full-bridge and push-pull are well suited for multiple-output extension since each output can be independently controlled by full-wave magnetic amplifiers on the secondary side provided for each output without affecting soft-switching operation on the primary side of the converter or other outputs. As an example, only the soft-switching half-bridge converter with two outputs is shown in FIG. 26. The primary-side switches Q1 and Q2 are still driven at a fixed frequency and close to 50% duty cycle, and there is no need for feedback isolation. The problems inherent to the PWM half-bridge converter with magamps as post-regulators, such as need for freewheeling diode operation, minimum load on the main output, undesirable voltage spikes on the main outputs due to energy stored in the magamp's saturated inductances, are all eliminated since the transformer TR is never shorted.

Examples of a dc-to-dc converter with magnetic amplifiers have been presented which exhibit soft-switching in all switches and PWM output voltage regulation at constant switching frequency. Both soft-switching and the output voltage regulation are obtained by using voltage bidirectional switches on the secondary side of an isolation transformer realized with magnetic amplifiers. All examples of the present invention use a soft-switching mechanism different from that used in the prior-art buck converter which provides soft-switching from no-load to full load, even with small output inductor ripple current, whereas in the prior art such performance is not achieved. In addition, the present invention features symmetrical transition intervals.

Primary-side switches, realized by MOSFET devices, are alternately driven at a constant frequency and close to 50% duty ratio with a small dead-time, while voltage bidirectional secondary-side switches, are alternately driven at exactly 50% duty ratio with variable delay with respect to the primary switches.

Zero-voltage switching in the MOSFET devices is naturally provided by reflected DC load current to the primary side which maintains the primary current in the same direction as before the MOSFET device was turned-OFF. Zero-current switching of the rectifier diodes is provided by the action of the saturable inductors due to their non-linear, square loop magnetic characteristic. Output voltage regulation is achieved by varying the blocking interval of the magnetic amplifiers using a control circuit on the secondary side, which eliminates the need for isolation of the feedback signal and results in a simple control circuit that requires no isolation in the secondary-side closed loop.

The soft-switching converters with magnetic amplifier as described with reference to FIGS. 15, 23, 25 and 26 for a half-bridge converter as examples of the present invention, eliminate the key disadvantages of the conventional soft-switching converter topologies while keeping the simplicity of prior-art pulse width-modulated (PWM) converters.

We claim:

1. A soft-switching dc-to-dc converter comprising an isolation transformer with two secondary windings and one primary winding, each secondary winding having one end connected to an output return current path and the other end coupled to an output low-pass filter at a common junction by a separate one of a pair of voltage bidirectional switches, said two secondary windings being wound in opposite sense, such as in a half-bridge converter, means for regulation of output voltage from said low-pass filter, a pair of current bidirectional switching means connected to said primary winding for convening a dc voltage to a square-wave voltage, said pair of current bidirectional switching means being responsive to control means for alternately turning on each of said pair of current bidirectional switching means at a constant switching frequency with a duty ratio close to 50% and with an adjustable dead time between turning off one of said pair of current bidirectional switching means and turning on the other of said pair of switching means, said dead time being sufficient to assure that voltage across the other of said pair of current bidirectional switching means drops to zero volts before the other of said pair of current bidirectional switching means is turned on, thereby assuring zero volt switching of said pair of current bidirectional switching means for converting a dc voltage to a square-wave voltage, wherein each of said pair of voltage bidirectional switches couples a separate one of said two secondary windings to said low-pass filter at said common junction, thereby delaying turn-on voltage through one of said voltage bidirectional switches that is off while the other of said voltage bidirectional switches that is on is turned off, thereby providing voltage out of phase with current at said common junction until said one voltage bidirectional switch is turned on, means for sensing voltage at a common point between said pair of current bidirectional switching means connected to said primary winding, and means responsive to said sensing means for enabling alternate turn on of each of said pair of current bidirectional switching means only at zero voltage, whereby zero volts switching is preserved for primary current bidirectional switching means and secondary bidirectional voltage switches under all operating conditions from full load current to no-load while said output voltage regulation means maintain output voltage constant.

2. A soft-switching dc-to-dc converter as defined in claim 1 wherein said output voltage regulation means comprising means for comparing output voltage from said low-pass filter with a reference voltage set to regulate desired output voltage to a load, and means response to said comparing means for providing a control signal to each of said pair of voltage bidirectional switches to regulate output voltage at a level set by said reference voltage.

3. A soft-switching dc-to-dc converter as defined in claim 1 including a second pair of current bidirectional switching means connected to said primary winding to form with said first pair of switching means a full-bridge dc-to-dc converter.

4. A soft-switching dc-to-dc converter as defined in claim 1 wherein said transformer includes 2N secondary windings associated in pairs, where N is an integer equal to or greater than 2, and each secondary winding of each pair has one end connected to its corresponding output return current path and the other end coupled to a separate low-pass filter at a common junction by a separate pair of voltage bidirectional switches, said two secondary windings associated in pairs being wound in opposite sense to each other, thereby providing voltage out of phase with current at said common junction of said separate low-pass filter until separate ones of said pair of voltage bidirectional switches to be turned on are on.

5. A soft-switching dc-to-dc converter as defined in claim 1 with two primary windings, each primary winding connected to one of said current bidirectional switching means to form a push-pull dc-to-dc converter.

6. A soft-switching dc-to-dc converter comprising an isolation transformer with two secondary windings and one primary winding, each secondary winding having one end connected to an output return current path and the other end coupled to a low-pass filter at a common junction by one of a pair of magnetic amplifier switches, each of said pair of magnetic amplifier switches comprising a saturable reactor and series connected diode for coupling a separate one of said two secondary windings to said low-pass filter at said common junction, and said two secondary windings being wound in opposite sense, at least one pair of current bidirectional switching means connected to said primary winding for converting a dc voltage to a square-wave voltage, said pair of current bidirectional switching means being responsive to control means for alternately turning on each of said pair of current bidirectional switching means at a constant switching frequency with a duty ratio close to 50% and with an adjustable dead time between turning off one of said pair of current bidirectional switching means and turning on the other of said pair of current bidirectional switching means, said dead time being sufficient to assure that voltage across the other of said pair of current bidirectional switching means drops to zero volts before the other of said pair of current bidirectional switching means is turned on, thereby assuring zero volt switching of said pair of current bidirectional switching means for converting a dc voltage to a square-wave voltage, and means for providing a reset control current at a junction between said saturable reactor and series diode of each of said pair of magnetic amplifier switches for regulation of voltage at an output terminal of said low-pass filter, thereby delaying turn-on voltage through said saturable reactor of a diode that is off of said magnetic amplifier switches while a diode that is on is turned off, thereby providing voltage out of phase with current to said low-pass filter until said saturable reactor in series with said diode to be turned on saturates.

7. A soft-switching dc-to-dc converter circuit as defined in claim 6 including output voltage regulation means comprising means for comparing output voltage from said low-pass filter with a reference voltage set to regulate desired output voltage to a load, and means responsive to said comparing means for providing said control current to each of said pair of magnetic amplifier switches to regulate output voltage to a load at a level set by said reference voltage.

8. A soft-switching dc-to-dc converter circuit as defined in claim 7 including means for sensing voltage at a common point between said pair of current bidirectional switching means connected to said primary winding, and means responsive to said sensing means for alternately turning on each of said pair of current bidirectional switches only at zero voltage, whereby zero volt switching is preserved for all operating conditions over an extended range of soft switching while said output voltage regulation means maintain output voltage to said load constant over a wide range from no load to full load.

9. A soft-switching dc-to-dc converter as defined in claim 7 including a second pair of current bidirectional switching means connected to said primary winding to operate with said first pair of switching means as a full-bridge dc-to-dc converter.

10. A soft-switching dc-to-dc converter as defined in claim 7 wherein said transformer includes 2N secondary windings associated in pairs, where N is an integer equal to or greater than 2, and each secondary winding of each pair has one end connected to an output return current path and the other end coupled to a separate low-pass filter at a common junction by a separate pair of magnetic amplifier switches, said two secondary windings associated in pairs being wound in opposite sense to each other and said separate pair of magnetic amplifier switches for each pair of secondary windings each comprising a separate saturable reactor and series connected diode, thereby providing voltage out of phase with current from said separate pair of magnetic amplifiers to said separate low-pass filter until each separate saturable inductor of separate ones of said pair of magnetic amplifier switches in series with a diode connected to the associated low-pass filter saturates to turn said diode connected in series with said associated low-pass filter.

11. A soft-switching dc-to-dc converter as defined in claim 6 with two primary windings, each primary winding connected to one of said current bidirectional switching means to form a push-pull dc-to-dc converter.

* * * * *